(12) United States Patent  (10) Patent No.: US 8,720,125 B2
Andretich  (45) Date of Patent: May 13, 2014

(54) SUSTAINABLE, MOBILE, EXPANDABLE STRUCTURE

(76) Inventor: Micah F. Andretich, Santa Rosa, CA (US)

( * ) Notice: Subject to any disclaimer, the term of this patent is extended or adjusted under 35 U.S.C. 154(b) by 415 days.

(21) Appl. No.: 12/844,603

(22) Filed: Jul. 27, 2010

(65) Prior Publication Data
US 2011/0047891 A1    Mar. 3, 2011

Related U.S. Application Data

(60) Provisional application No. 61/271,925, filed on Jul. 28, 2009.

(51) Int. Cl.
*E04H 1/00* (2006.01)

(52) U.S. Cl.
USPC .......................... 52/79.5; 296/171; 52/173.3

(58) Field of Classification Search
USPC ........... 52/64, 67, 79.5, 66, 68, 69, 71, 173.3; 296/26.01, 26.02, 26.04, 165, 171, 296/26.03
See application file for complete search history.

(56) References Cited

U.S. PATENT DOCUMENTS

| | | | |
|---|---|---|---|
| 1,279,819 A * | 9/1918 | Zingsheim et al. | 52/67 |
| 2,270,161 A | 1/1942 | Briggs | |
| 2,704,223 A * | 3/1955 | Houdart | 296/26.13 |
| 2,732,251 A * | 1/1956 | Meaker | 296/171 |
| 2,813,747 A * | 11/1957 | Rice, Jr. | 296/171 |
| RE24,452 E * | 4/1958 | Meaker | 296/175 |
| 2,842,972 A * | 7/1958 | Houdart | 74/422 |
| 2,901,282 A * | 8/1959 | Meaker | 296/171 |
| 3,106,750 A * | 10/1963 | Jarman | 52/67 |

(Continued)

FOREIGN PATENT DOCUMENTS

| CN | 2717093 Y | 8/2005 |
|---|---|---|
| CN | 2914060 Y | 6/2007 |

(Continued)

OTHER PUBLICATIONS

Website: http://www.soaridaho.com/Scheder/HP-16/HP-16_Soaring/_Review.html Downloaded Jun. 25, 2010 Steve Du Pont, HP-16 The material is waterproof; this permits the inboard several feet of the leading edge ahead of the spar to be filled with water for ballast. It is merely necessary to provide a passage through the necessary ribs.

(Continued)

*Primary Examiner* — William Gilbert
*Assistant Examiner* — James Ference
(74) *Attorney, Agent, or Firm* — Russ Weinzimmer & Associates P.C.

(57) ABSTRACT

A sustainable, mobile, expandable, structure is designed for both short and long term deployments for various uses such as emergency or homeless shelters, fire crews, mobile clinics, research or vacation facilities. A body carriage assembly has wheels, has rigid frame assemblies and a fixed floor panel assembly fixed to it. Foldable roof panels contain energy collectors on their exterior surfaces, which are protected by a screen that is retractable into a void of a roof overhang. Foldable roof panels and adjacent foldable floor panels are deployed by a cabling system assembly, set in motion by a simple tool, requiring no motors or hydraulics. Foldable sidewall panels create eave walls when deployed. Foldable end wall panels create a gable end closure when deployed. A collapsible perimeter ballast assembly use, store and recycle water and provides a windscreen and wind forces.

9 Claims, 19 Drawing Sheets

(56) References Cited

U.S. PATENT DOCUMENTS

| | | | |
|---|---|---|---|
| 3,169,280 A * | 2/1965 | Jarman | 52/67 |
| 3,503,170 A | 3/1970 | Shelley | |
| 3,508,305 A | 4/1970 | Koonce et al. | |
| 3,532,299 A | 10/1970 | Williamson et al. | |
| 3,584,911 A | 6/1971 | Coletto, Jr. | |
| 3,596,416 A | 8/1971 | Hojka | |
| 3,620,564 A * | 11/1971 | Wenger et al. | 296/83 |
| 3,690,080 A | 9/1972 | Dillard | |
| 3,719,386 A * | 3/1973 | Puckett et al. | 296/26.13 |
| 3,731,644 A | 5/1973 | Bradt | |
| 3,792,557 A | 2/1974 | Pitts | |
| 3,840,267 A | 10/1974 | Honigman | |
| 3,866,365 A * | 2/1975 | Honigman | 52/70 |
| 3,908,577 A | 9/1975 | Struyk | |
| 3,941,414 A * | 3/1976 | Platt | 296/170 |
| 3,961,716 A | 6/1976 | Renaud | |
| 4,017,116 A * | 4/1977 | Hulsey | 296/156 |
| 4,023,368 A | 5/1977 | Kelly | |
| 4,041,974 A | 8/1977 | Keiser | |
| 4,049,310 A * | 9/1977 | Yoder | 296/176 |
| 4,059,931 A | 11/1977 | Mongan | |
| 4,151,872 A | 5/1979 | Slysh et al. | |
| 4,162,595 A * | 7/1979 | Ramos et al. | 52/69 |
| 4,261,329 A * | 4/1981 | Walsh et al. | 126/569 |
| 4,404,465 A | 9/1983 | Miller | |
| 4,421,943 A | 12/1983 | Withjack | |
| 4,429,178 A * | 1/1984 | Prideaux et al. | 136/246 |
| 4,452,234 A * | 6/1984 | Withjack | 126/627 |
| 4,488,752 A | 12/1984 | Broussard | |
| 4,500,132 A * | 2/1985 | Yoder | 296/171 |
| 4,555,585 A | 11/1985 | Behrens et al. | |
| 4,564,002 A | 1/1986 | Taylor | |
| 4,601,282 A * | 7/1986 | Mountain | 126/574 |
| 4,603,518 A | 8/1986 | Fennes | |
| 4,627,202 A | 12/1986 | Esposito | |
| 4,662,146 A | 5/1987 | Parry | |
| 4,689,926 A | 9/1987 | McDonald | |
| 4,747,566 A | 5/1988 | Kiendl | |
| 4,805,355 A | 2/1989 | Plant | |
| 4,832,002 A | 5/1989 | Medina | |
| 4,856,228 A | 8/1989 | Robinson, Sr. | |
| 4,883,340 A | 11/1989 | Dominguez | |
| 4,958,874 A * | 9/1990 | Hegedus | 296/26.02 |
| 4,988,060 A | 1/1991 | Janson et al. | |
| 4,995,377 A * | 2/1991 | Eiden | 126/605 |
| 5,011,544 A | 4/1991 | Gaddy et al. | |
| 5,061,001 A * | 10/1991 | Madden et al. | 296/26.12 |
| 5,106,142 A * | 4/1992 | Hegedus | 296/26.02 |
| 5,154,469 A * | 10/1992 | Morrow | 296/26.02 |
| 5,185,973 A * | 2/1993 | Oldani | 52/64 |
| 5,237,782 A * | 8/1993 | Cooper | 52/67 |
| 5,280,985 A * | 1/1994 | Morris | 296/26.15 |
| 5,291,701 A * | 3/1994 | Delacollette et al. | 52/67 |
| 5,295,430 A * | 3/1994 | Dewald et al. | 92/165 R |
| 5,332,276 A * | 7/1994 | Blodgett, Jr. | 296/26.13 |
| 5,333,420 A * | 8/1994 | Eden | 52/67 |
| 5,345,730 A * | 9/1994 | Jurgensen | 52/64 |
| 5,379,753 A | 1/1995 | Noennich | |
| 5,448,861 A | 9/1995 | Lawson | |
| 5,467,570 A | 11/1995 | Leek | |
| 5,489,002 A | 2/1996 | Streiff | |
| 5,706,615 A | 1/1998 | Bridges et al. | |
| 5,706,616 A * | 1/1998 | Fernandez | 52/143 |
| 5,706,846 A | 1/1998 | Sutton | |
| 5,771,639 A * | 6/1998 | Wood et al. | 52/71 |
| 5,785,280 A | 7/1998 | Baghdasarian | |
| 5,836,730 A | 11/1998 | Boydstun, IV et al. | |
| 5,906,339 A | 5/1999 | Basuthakur et al. | |
| 5,938,261 A | 8/1999 | Faba | |
| 5,964,065 A * | 10/1999 | Migurski et al. | 52/64 |
| 5,966,956 A * | 10/1999 | Morris et al. | 62/259.1 |
| 5,969,501 A | 10/1999 | Glidden et al. | |
| 5,984,396 A * | 11/1999 | Schneider | 296/26.14 |
| 6,003,919 A * | 12/1999 | Shook | 296/26.14 |
| 6,017,082 A * | 1/2000 | Leoni | 296/182.1 |
| 6,058,869 A | 5/2000 | Thon | |
| 6,104,910 A | 8/2000 | Koths | |
| 6,116,671 A * | 9/2000 | Schneider | 296/26.01 |
| 6,135,525 A * | 10/2000 | Amann | 296/26.11 |
| 6,161,339 A | 12/2000 | Cornett, Sr. et al. | |
| 6,185,878 B1 | 2/2001 | Bullard, III et al. | |
| 6,209,939 B1 * | 4/2001 | Wacker | 296/24.3 |
| 6,243,992 B1 | 6/2001 | Gyllenhammar | |
| 6,257,638 B1 | 7/2001 | Graber | |
| 6,286,883 B1 * | 9/2001 | Schneider et al. | 296/26.14 |
| 6,293,612 B1 * | 9/2001 | Crean | 296/175 |
| 6,393,769 B1 * | 5/2002 | Mertik et al. | 52/7 |
| 6,393,775 B1 * | 5/2002 | Staschik | 52/79.1 |
| 6,396,239 B1 * | 5/2002 | Benn et al. | 320/101 |
| 6,434,895 B1 * | 8/2002 | Hosterman et al. | 52/143 |
| 6,502,523 B1 | 1/2003 | Robb | |
| 6,583,522 B1 | 6/2003 | McNulty et al. | |
| 6,688,048 B2 * | 2/2004 | Staschik | 52/79.1 |
| 6,712,414 B2 | 3/2004 | Morrow | |
| 6,722,357 B2 | 4/2004 | Shingleton | |
| 6,772,563 B2 * | 8/2004 | Kuhn | 52/67 |
| 6,843,027 B2 | 1/2005 | Gaddie et al. | |
| 6,848,442 B2 | 2/2005 | Haber | |
| 6,851,734 B2 * | 2/2005 | Findley | 296/26.13 |
| 6,909,042 B2 | 6/2005 | Geyer et al. | |
| 6,969,105 B2 * | 11/2005 | Rincoe | 296/26.13 |
| 6,997,495 B1 * | 2/2006 | Groezinger | 296/26.15 |
| 7,013,829 B1 | 3/2006 | Alexander | |
| 7,017,975 B2 | 3/2006 | Parmer | |
| 7,194,842 B2 | 3/2007 | Baird | |
| 7,230,819 B2 * | 6/2007 | Muchow et al. | 361/601 |
| 7,249,568 B1 | 7/2007 | Cultrara | |
| 7,273,019 B2 | 9/2007 | Towley, III et al. | |
| 7,357,440 B1 | 4/2008 | Calandruccio | |
| 7,360,784 B2 | 4/2008 | Stewart et al. | |
| 7,445,275 B2 | 11/2008 | Woodhouse et al. | |
| 7,469,541 B1 * | 12/2008 | Melton et al. | 60/641.1 |
| 7,487,734 B2 | 2/2009 | Davis | |
| 7,492,120 B2 * | 2/2009 | Benn et al. | 320/101 |
| 7,513,250 B2 | 4/2009 | Head et al. | |
| 7,540,546 B2 | 6/2009 | Kern et al. | |
| D600,200 S | 9/2009 | Dimov et al. | |
| 7,677,242 B2 | 3/2010 | Carcangiu et al. | |
| 7,695,049 B2 | 4/2010 | Colborne | |
| 7,712,813 B2 * | 5/2010 | Di Franco | 296/26.14 |
| 2002/0060467 A1 * | 5/2002 | McManus et al. | 296/26.01 |
| 2002/0063441 A1 * | 5/2002 | Young, Sr. | 296/165 |
| 2002/0089212 A1 * | 7/2002 | Garceau et al. | 296/165 |
| 2002/0171255 A1 * | 11/2002 | Eichhorn | 296/26.01 |
| 2002/0180232 A1 * | 12/2002 | Schneider et al. | 296/26.01 |
| 2002/0189173 A1 * | 12/2002 | Staschik | 52/79.1 |
| 2003/0009954 A1 * | 1/2003 | Bradley | 52/79.1 |
| 2003/0115808 A1 * | 6/2003 | Morrow | 52/64 |
| 2003/0213185 A1 * | 11/2003 | Findley | 52/67 |
| 2004/0108750 A1 * | 6/2004 | Park | 296/156 |
| 2004/0119853 A1 | 6/2004 | Kokubun et al. | |
| 2004/0124711 A1 * | 7/2004 | Muchow et al. | 307/64 |
| 2005/0062305 A1 * | 3/2005 | Blaudow | 296/26.01 |
| 2006/0087151 A1 * | 4/2006 | Ting et al. | 296/165 |
| 2006/0113251 A1 * | 6/2006 | McGuire et al. | 210/652 |
| 2006/0113822 A1 * | 6/2006 | Kunz | 296/165 |
| 2006/0137348 A1 * | 6/2006 | Pas | 60/641.1 |
| 2006/0145499 A1 * | 7/2006 | Boon | 296/26.14 |
| 2006/0277836 A1 | 12/2006 | Chazyn | |
| 2007/0090629 A1 | 4/2007 | Ohnstad et al. | |
| 2007/0125417 A1 | 6/2007 | Johanson et al. | |
| 2007/0170740 A1 * | 7/2007 | Di Franco | 296/26.13 |
| 2007/0210236 A1 * | 9/2007 | Yungner et al. | 248/678 |
| 2007/0216183 A1 * | 9/2007 | Few et al. | 296/26.01 |
| 2007/0228692 A1 * | 10/2007 | Kern et al. | 280/403 |
| 2008/0040990 A1 | 2/2008 | Vendig et al. | |
| 2008/0142059 A1 | 6/2008 | Bonebrake | |
| 2008/0196758 A1 * | 8/2008 | McGuire | 136/245 |
| 2008/0251115 A1 | 10/2008 | Thompson et al. | |
| 2009/0014054 A1 | 1/2009 | Cano Messeguer et al. | |
| 2009/0205266 A1 * | 8/2009 | Fennell | 52/79.1 |
| 2009/0277699 A1 | 11/2009 | Wan | |
| 2009/0288698 A1 | 11/2009 | Chen | |
| 2009/0288891 A1 | 11/2009 | Budge | |

(56) References Cited

U.S. PATENT DOCUMENTS

| | | | |
|---|---|---|---|
| 2010/0018570 | A1 | 1/2010 | Cashion et al. |
| 2010/0024314 | A1* | 2/2010 | Pope .................................. 52/67 |
| 2010/0024315 | A1* | 2/2010 | Pope .................................. 52/67 |
| 2010/0024317 | A1* | 2/2010 | Pope ............................... 52/79.5 |
| 2010/0024319 | A1* | 2/2010 | Pope ............................... 52/79.9 |
| 2010/0024349 | A1* | 2/2010 | Pope ......................... 52/745.02 |
| 2010/0024350 | A1* | 2/2010 | Pope ......................... 52/745.02 |
| 2010/0024351 | A1* | 2/2010 | Pope ......................... 52/745.02 |
| 2010/0043781 | A1 | 2/2010 | Jones et al. |
| 2010/0051086 | A1 | 3/2010 | Keshner et al. |
| 2010/0126554 | A1 | 5/2010 | Morgan et al. |

FOREIGN PATENT DOCUMENTS

| | | | |
|---|---|---|---|
| CN | 2923860 | Y | 7/2007 |
| CN | 201035923 | Y | 3/2008 |
| CN | 201077365 | Y | 6/2008 |
| CN | 201118482 | Y | 9/2008 |
| CN | 201231704 | Y | 5/2009 |
| CN | 201240399 | Y | 5/2009 |
| CN | 101451398 | A | 6/2009 |
| CN | 101487349 | A | 7/2009 |
| CN | 201319566 | Y | 9/2009 |
| EP | 1035591 | A1 | 9/2000 |
| EP | 1754845 | A1 | 2/2007 |
| EP | 1995535 | A2 | 11/2008 |
| EP | 2083451 | A1 | 7/2009 |
| EP | 2123993 | A1 | 11/2009 |
| GB | 2240517 | A | 8/1991 |
| JP | 61266814 | A2 | 11/1986 |
| JP | 03010988 | A2 | 1/1991 |
| JP | 06144131 | A2 | 5/1994 |
| NL | 1026606 | C2 | 1/2006 |
| WO | 8302594 | A1 | 8/1983 |
| WO | 8400803 | A1 | 3/1984 |
| WO | 9108708 | A1 | 6/1991 |
| WO | 2008047146 | A1 | 4/2008 |
| WO | 2008054377 | A3 | 9/2008 |
| WO | 2008129589 | A2 | 10/2008 |
| WO | 2007038760 | A3 | 4/2009 |
| WO | 2009099571 | A2 | 8/2009 |
| WO | 2010010513 | A2 | 1/2010 |
| WO | 2010054496 | A2 | 5/2010 |

OTHER PUBLICATIONS

Website: http://www.answers.com/topic/ferris-wheel Downloaded Jun. 25, 2010 Transportable Wheels Larger transportable wheels are designed to be repeatedly dismantled and rebuilt, some using water ballast instead of the permanent foundations of their fixed counterparts.

Website: http://www.thomasnet.com/heading.html?cov=NA&what=Frame+Supported+Tension+Structure+Warehouses&heading=92130855&searchpos=22&cid=30094861&TAXONOMY_CAT=F155420; CNONE&PrdS_SEARCH_PHRASE=Frame+Supported+Tension+Structure+Warehouses Downloaded Aug. 3, 2010 Modular Post Tension Structures.

Website: http://www.inhabitat.com/2009/04/01/mobile-rolling-stone-eco-capsule-home/ Downloaded Dec. 5, 2009 Rolling Stone Eco-Capsule Home.

Website: http://www.dezeen.com/2009/10/29/opera-by-axel-enthoven/ Downloaded Dec. 5, 2009 Mobile Holiday Home.

Website: http://www.emergencyresponsestudio.org/ Downloaded Dec. 5, 2009 Emergency Response Studio.

Website: http://tinyhouseblog.com/stick-built/first-wind-powered-tiny-house/comment-page-1/#comment-91851 Downloaded Dec. 5, 2009 First Wind Powered Tiny House?.

Website: http://www.trafcon.com/pep.html Downloaded Jun. 18, 2010 Portable Equipment Platform, Solar Powered.

Website: http://www.rio02.com/proceedings/pdf/151_Koehler.pdf Downloaded Jun. 18, 2010 Photovoltaic-Panels on Greened Roofs.

Website: http://en.wikipedia.org/wiki/File:Gemini-house-2001.jpg Downloaded Jun. 18, 2010 Gemini House rotates in its entirety and the solar panels rotate independently, allowing control of the natural heating from the sun.

Website: http://www.youtube.com/watch?v=fv4jifkXR9s Downloaded Jun. 18, 2010 Freely rotating solar array.

Website: http://www.ecofriend.org/entry/e-bike-just-solar-energy-is-enough/ Downloaded Jun. 22, 2010 E-Bike in such E- bikes, pinion seat has been replaced by Solar Panel Array and the two panels fold down once the carrier comes into motion.

Website: http://www.backwoodshome.com/articles2/yago108.html Downloaded Jun. 22, 2010 Solar Power Trailer.

* cited by examiner

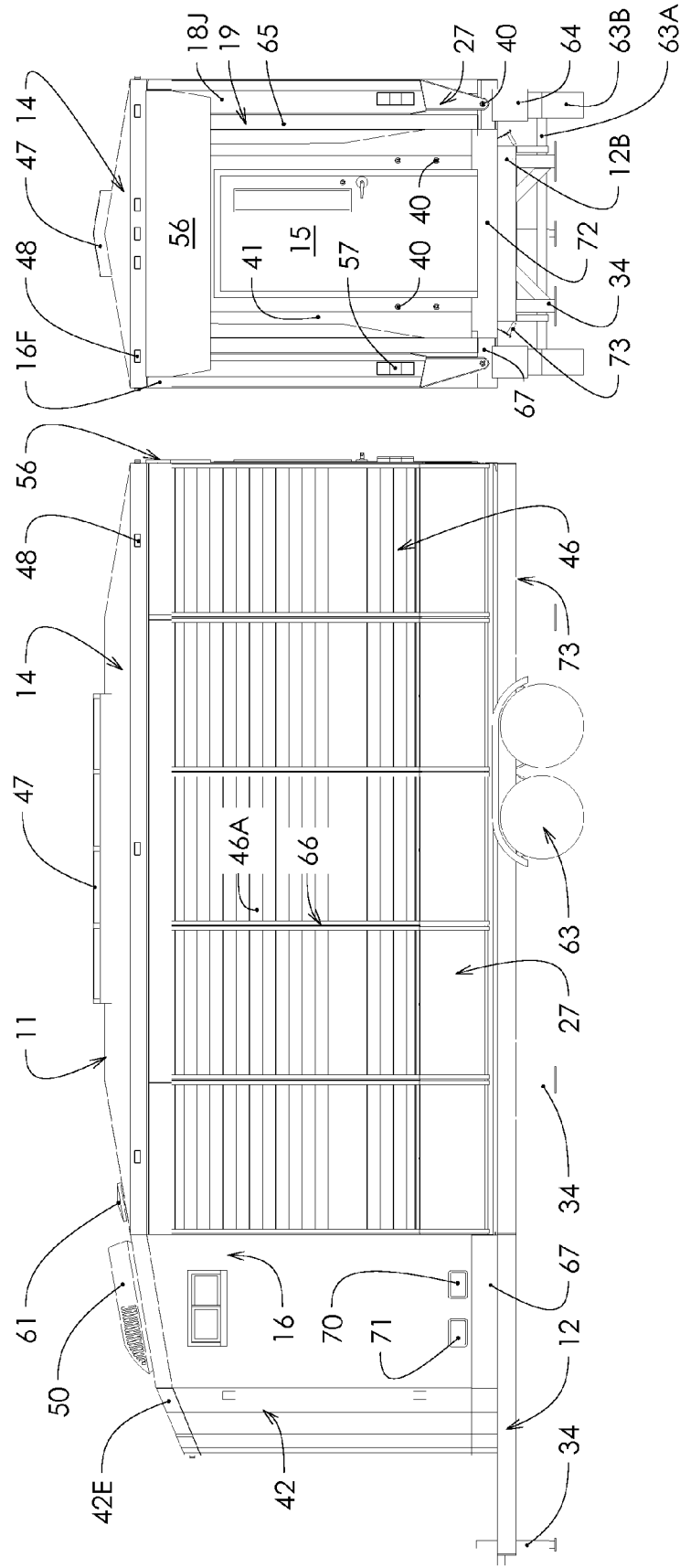

SUSTAINABLE, MOBILE, EXPANDABLE STRUCTURE

CROSS-REFERENCE TO RELATED APPLICATIONS

This application claims priority to U.S. Provisional Application No. 61/271,925 having a filing date of Jul. 27, 2009 entitled "Sustainable, Mobile, Expandable Structure" which is incorporated herein by reference in its entirety.

FIELD OF THE INVENTION

This relates to mobile structures, specifically to mobile structures that can be readily transported then expanded to substantially increase interior volume without the use of motors and/or hydraulics. A mobile structure that can operate in locations without an electrical supply and can accommodate extended deployment periods without servicing. A mobile structure integrating sustainable features during deployment such as solar power generated electricity, solar water and space heating, water collection, use, and storage as well as bio waste disposal. A mobile structure with a system to protect and deploy energy collector assemblies omni-directionally. A mobile structure with a means to protect the structure from the effects of wind loading such as up-lift forces. A mobile structure utilizing construction materials and techniques that create and maintain healthy indoor air quality and that allow for recycling of the structure.

BACKGROUND OF THE INVENTION

Mobile expandable structure designs to date have basically tried to provide a ready-made, weather resistant volume of space. Heating systems, electrical power, water storage and disposal systems, if provided at all, would typically be addressed in a fashion similar to recreational type vehicles and/or require fixed utility connections. Some mobile structures utilizing after market solar panel products may require breaching of the roofing membrane for installation affecting weather resiliency of the structure. The panels, being attached to the roof also remain vulnerable to theft and the elements when not in use. Additionally, the panels are not readily re-directed for optimal solar gain without repositioning of the structure, which may not always be possible.

After market systems are typically not adequate to fully support the electrical requirements of extended deployments as dependence remains on 12-volt systems that need to be re-charged via petroleum-fueled generators and/or by connection to an electrical feed. Holding tanks for fresh, 'gray' or 'black' water require periodic servicing that may require travel to a dumpsite requiring retraction of the deployed structure. Additionally, current construction techniques and finishes can lead to or cause deleterious interior air quality such as molds or off gassing from materials.

Inventions to date have not fully addressed a lightweight, mobile expandable structure design that incorporates the use of sustainable features and other techniques to allow for extended periods of deployment while increasing user comfort and ease of use.

Both U.S. Pat. No. 5,061,101 to Madden; Maginnis (1991) and U.S. Pat. No. 6,712,414 to Morrow (2004) present expandable systems. U.S. Pat. No. 5,061,101 utilizes a base enclosure assembly with retractable modules that extend out from the base assembly. While U.S. Pat. No. 6,712,414 shows opposing side sections that can be retracted, similar to "pop-outs or slide-outs" in the recreational vehicle industry. The width of the retractable portions is often limited to half the width of the base assembly, if not less, due to the complicated mechanical and structural requirements. Consequently, designs such as this can offer only an approximate doubling of overall floor area in the deployed condition. The dual sided design also makes access to, or through the core structure difficult if not impossible during transport.

An increase in relative floor area is shown in U.S. Pat. No. 4,603,518 to Fennes (1986). Here a collapsible mobile building is shown. The increase in size is accomplished by pivotally connecting the collapsible portions to the fixed base. Using motors, the collapsible units travel through an approximate 90° arc where they are subject to racking loads due to the designs geometry. Once in place, the collapsible units have roofs that are higher than the central base unit making for uncertain weather protection issues along the longitudinal interfaces of the fixed and collapsible portions. Also, the conveyance is shown using a heavy-duty tractor-trailer type rig for transport. The increased floor areas of this design would also be subject to the increased effects of wind loading such as 'uplift' forces on the structure.

U.S. Pat. No. 4,534,141 to Fagnoni (1985) and U.S. Pat. No. 5,996,956 to Morris: Rogers (1999) show an alternative means of deployment to the patents mentioned above. However, both patents are not shown to be independently mobile, via mounting to a permanent wheeled conveyance, U.S. Pat. No. 4,534,141 shows substantial longitudinal base beams that are integral to the floors longitudinal frame requiring the support of a foundation such as a concrete slab or pad footings as there are no means for terrain adjustments along this central support core. Additionally, the longitudinal fixed frames of the walls are primarily solid and allow for only nominal passage to the deployed areas that are on either side of the core thus reducing floor plan flexibility. Gutters are shown in the detailed views but do not offer a means to use or store collected water. Insulation of the structure is also greatly compromised at the junctures of the foldable roof connection to the eave walls creating a poor thermal condition at a critical area of any heated structure.

U.S. Pat. No. 5,996,956 shows a portable refrigerated storage unit that may function as a structure or a mortuary in emergency situations. The unit is designed for shipping and transporting in a standard cargo-shipping container. Shipping container size constraints limit the structures interior height and volume when deployed; this may impinge on the users overall well being if the structure is to be used for extended periods.

The design also utilizes steel for both the skin and structural elements, making for a heavy overall weight. The design shows the foldable floor, wall and roof panels each being deployed in two segments requiring additional trim and flashing pieces to be installed at their common junctures. Other individual parts are also shown that need to be separately installed to complete the deployment. If these pieces are not installed properly or the pieces or lost or misplaced, the structure may not function properly affecting weather resiliency; which if compromised, may lead to an uncomfortable interior environment and possible health issues as well as adversely affecting the structural integrity of the structure.

In conclusion, insofar as I am aware, no self-sustaining, mobile, expandable structure developed provides the mobility of a lightweight wheeled conveyance that can expand easily to approximately three times the area of the unit in transport, requiring no motors or mechanized tools and can provide protection from wind up-lift forces while providing extensive water fresh and grey water handling capabilities.

SUMMARY

An improved sustainable, mobile, expandable, structure used for both short and long term deployments. An aluminum body carriage and aluminum structural members in the panel assemblies keep the structure lightweight. The use of primarily bolted and/or screwed connections allow for shipping of the structure in pre-fabricated panels or in individual pieces, such as a kit if required. Floor, wall and roof panel assemblies utilize rigid insulation providing insulation values comparable to fixed structures.

Through the use of an integral aluminum skin the rigid insulation is provided a thermal barrier at the interior faces of the wall and roof panel assemblies, satisfying a degree of fire protection stated in most model codes, while also being a hygienic, easy to clean low maintenance finish that does not harbor mold.

A structure that does not require site installed flashing or trim pieces to complete deployment. A structure providing a means to deploy and then direct extensive areas of solar energy assemblies for optimal solar gain, independent of the mobile structures orientation, while also affording a means to store and protect the assemblies both during transport and deployment. A structure that can capture and store solar energy for electricity as well as water and space heating allowing for remote and/or extended deployments where electrical utilities may not be available. A structure that provides a means for the collection and storage of rain water as well as a system for increased fresh and gray water storage, use, and recycling utilizing the mass of the stored water to counter the effects of wind such as up-lift forces on the deployed structure. A structure that allows flexible interior floor plan configurations made available through the use of removable interior partitions, while also providing for biowaste disposal without retraction of the deployed structure.

Accordingly several advantages are to provide for a compact, self-sustaining mobile structure that is easily transportable on roads with an improved ratio of deployed area/volume while simplifying the number of moving parts, sub-structures or by deletion of motors or specialized equipment required for deployment. Still further advantages will become apparent from a study of the following description and the accompanying drawings.

BRIEF DESCRIPTION OF THE DRAWINGS

FIG. 10 and FIG. 11 are respectively a side elevation and a rear elevation of the mobile structure shown in a transport mode.

DETAILED DESCRIPTION

Figure 1:
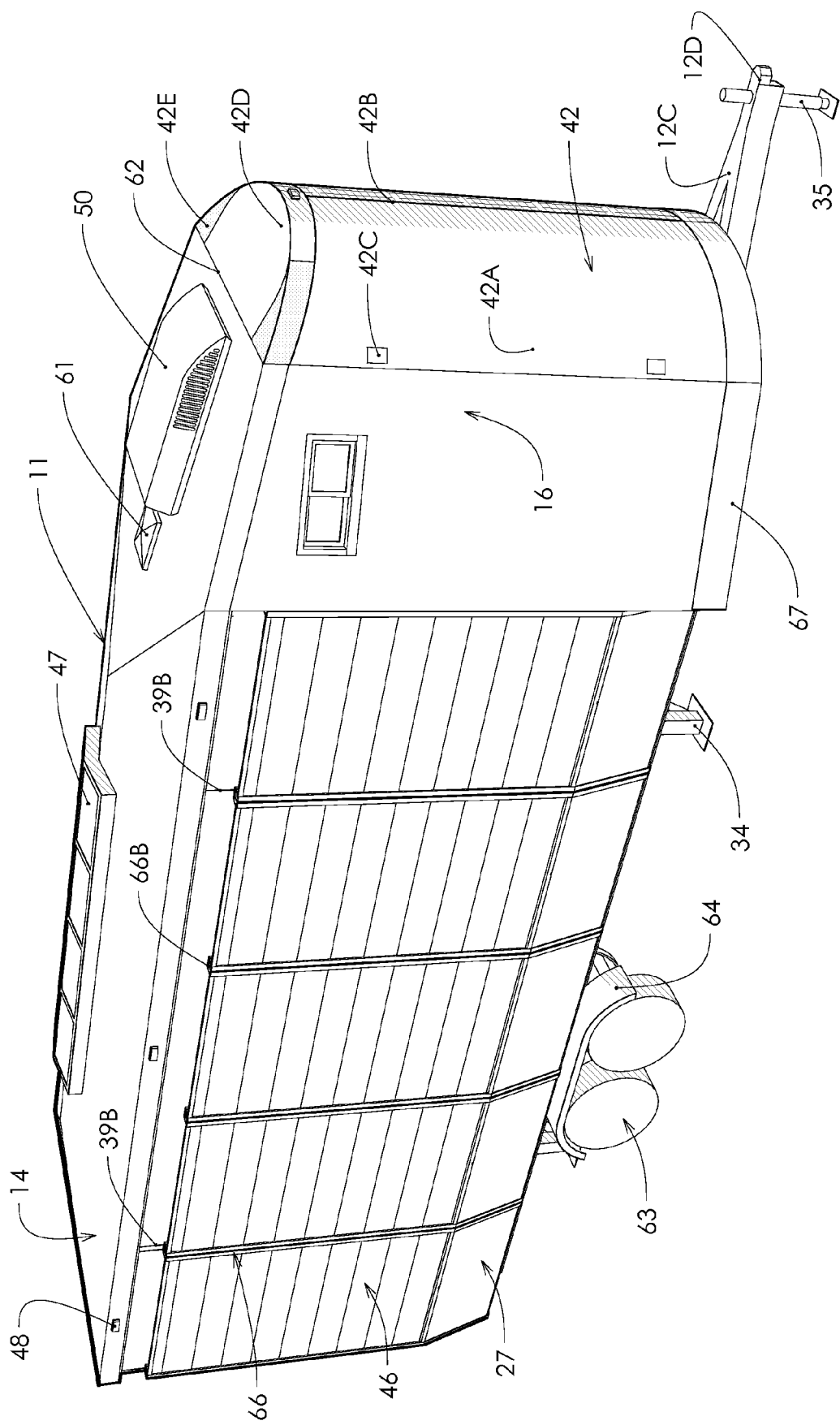
FIG. 1 is a perspective left-side front view of a mobile structure constructed in accordance with the invention, showing the invention in transport mode.

FIG. 1 is an exterior perspective view taken from the towing end of the mobile, expandable, structure 11 constructed in accordance with one embodiment. The view shows the structure 11 in a transport or non-deployed mode. A body carriage assembly 12, consisting of two longitudinal beams 12A, transverse beams 12B, (12A, 12B not shown) angled neck beams 12C, and hitch 12D provide the platform for mounting a wheel/axle assembly 63 with fender 64 above. Nearest the hitch 12D, is a secondary leveling pad 35, and a forward enclosure assembly 42 is shown for securing fuel storage cylinders such as liquid propane gas.

The forward enclosure assembly 42 consists of two door panels 42A, a hinge for each panel 42B, 2 locking mechanisms 42C, for each panel, a roof panel 42D provides weather protection and a means to mount two perforated panels 42E for screening plumbing stack vents from direct view. Adjacent to the forward enclosure assembly 42 is the fixed wall panel assembly 16, which are located on either side of the structure 11. Wall panel assembly 16 consisting of top and bottom metal channels 16A, metal 'I' stud framing 16B. Rigid insulation 16C is installed to a thickness that would provide at least a R-20 insulation value and is mounted in-between the metal 'I' stud framing 16B.

The rigid insulation has a layer of aluminum disposed to the interior plane of the wall. The aluminum layer is of sufficient thickness to satisfy model code requirements for a thermal barrier to the rigid insulation. The exterior skin consists of a monolithic sheet of fiberglass siding 16E adhered to a structural diaphragm substrate 16D. Trim with compressible weather-strip 16F (see FIG. 11) provides weather tightness during transport when in contact with the guide rail assemblies 66 and the roof overhang assemblies 27 and also by panel assemblies 16 juncture with the foldable end wall panel assemblies 21 when structure 11 is in a deployed mode.

A rock guard 67 is at the base of both the wall panel assemblies 16, and the forward enclosure assembly 42. Rock guard 67 has a plurality of vertical spaced runners that hold the body of the guard off the plane of the fiberglass siding 16E, allowing water to drain in the void created. A fixed roof panel assembly 14 spans the remainder of the structure 11 and is shown with a venting skylight 47, a remote air conditioning unit 50, and a mechanical equipment vent 61, running lights 48 are located at the fascia edge of the fixed roof panel assembly 14 as well as at the leading edge of the roof panel 42D.

Drainage channel 62 redirects water to the edge of the structure 11. A series of guide rail assemblies 66 are shown allowing for movement of a retractable screen assembly 46. The primary leveling pads 34 are shown at the bottom of the structure 11.

Figure 2:
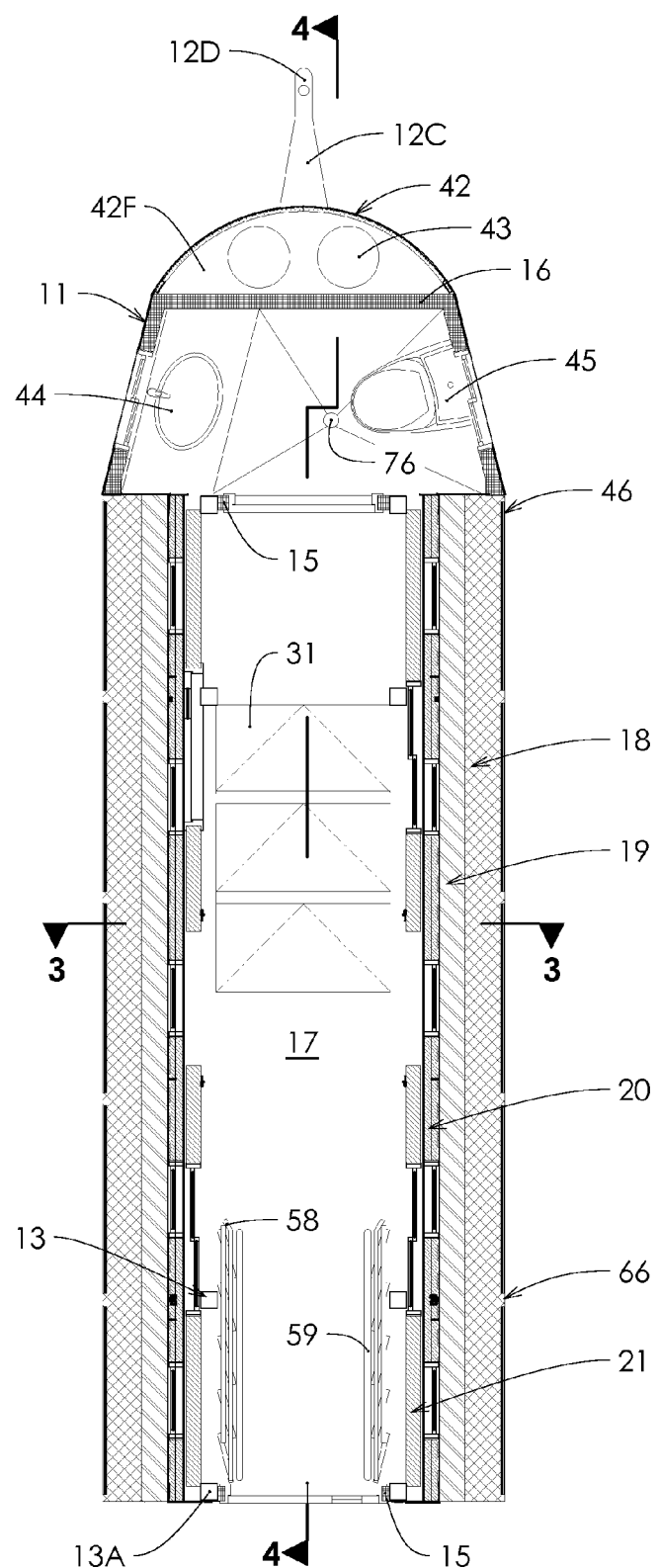
FIG. 2 is a plan view of the mobile structure shown in FIG. 1.

FIG. 2 is a plan view of the structure 11, while in a transport or non-deployed mode. A plurality of rigid frame assemblies 13 and a fixed floor panel assembly 17 are secured to the body carriage assembly 12. Floor access panels 31, provide a means to service sub-floor components (not shown) such as the fresh water vessel 54, hydronic heating water vessel 68, as well as the energy storage equipment 55 shown in later figures.

Fixed wall panel assemblies 16 extend obliquely from the fixed end wall panel assembly 15 and when joined by an additional fixed wall panel assembly 16 disposed adjacent to the forward enclosure assembly 42 provide an enclosure of insulated space where the sink/lavatory 44, gray water vessel 44A (not shown) and incinerating toilet 45 are located. A floor drain 76 provides drainage of water when the showerhead 77 is utilized (not shown.) The fixed end wall panel assemblies 15 are located at each end of the operable portion of the structure 11 and consist of top and bottom metal channels 15A, metal 'I' stud framing 15B.

Rigid insulation 15C is installed to a thickness that would provide at least a R-20 insulation value and is mounted in-between the metal 'I' stud framing 15B. The rigid insulation has a layer of aluminum disposed to the interior planes of the wall. The aluminum layer is of sufficient thickness to satisfy model code requirements for a thermal barrier to the rigid insulation.

The exterior skin of assembly 15 (shown near the bottom of the figure) consists of a monolithic sheet of fiberglass siding 15E adhered to a structural diaphragm substrate 15D. Fixed end wall base flashing 72 (see FIG. 11) provides weather tightness at the juncture of assembly 15 and the body carriage assembly 12.

The operable portions of the structure 11 are shown longitudinally. From the exterior side of the structure 11, to the interior side are shown the retractable screen assembly 46. The retractable screen assemblies 46 protect the energy collector assemblies 26 and add a level of protection from theft of assembly 26 during transport or if required during the structures deployment. The guide rail assemblies 66 are mounted to the foldable roof panel assemblies 18 which in turn are secured to roof hinges 28 shown in FIG. 3 that are disposed along the longitudinal outside bottom edge of the fixed roof panel assemblies 14 shown in FIG. 3.

Disposed adjacent to the foldable roof panel assemblies 18 is the foldable floor panel assembly 19, which in turn is hinged to the foldable side wall panel assembly 20. The foldable floor panel assembly 19 is hinged longitudinally via a floor hinge 29 shown in (FIG. 3) that is secured to the perimeter metal channel of the fixed floor panel assembly 17. Foldable end wall panel assemblies 21 are mounted to the rigid frame assembly 13. The collapsible stair 58 and removable handrail 59 are shown just inside the door to the structure 11. Interior partitions 74 are not shown.

Figure 3:
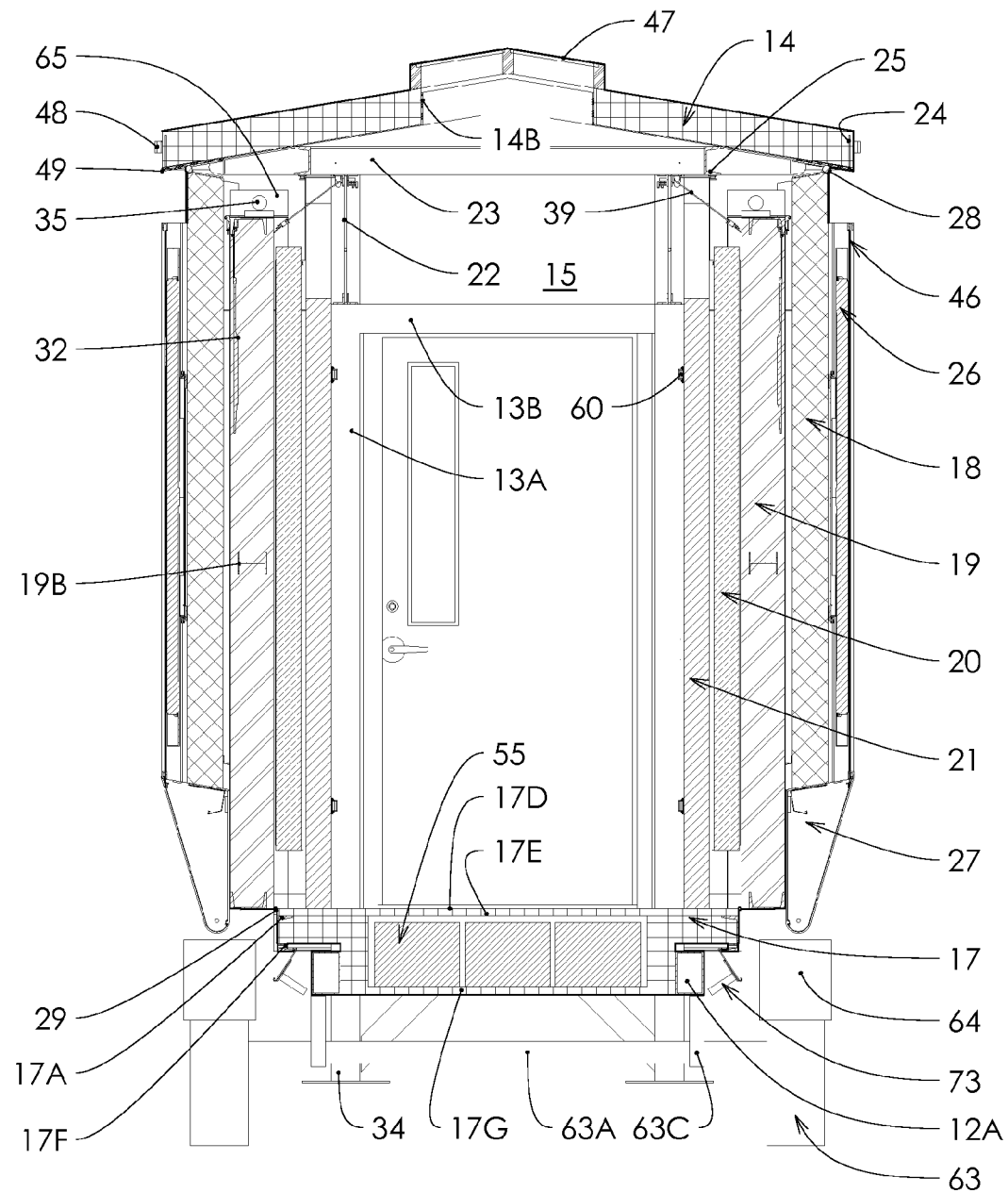
FIG. 3 is a lateral cross-sectional/elevation view of the mobile structure shown in FIGS. 1 and 2.

FIG. 3 is a lateral cross-section, elevation view of the mobile, expandable, structure 11 in transport or non-deployed mode. The collapsible stair 58 and removable handrail 59 are omitted for clarity. Longitudinal beams 12A provide a mounting surface for the leaf spring suspension 63C, axle 63A, and wheels 63B. A rigid frame assembly 13 is shown comprised of two vertical components 13A rigidly connected to at least one horizontal component 13B.

The bases of the vertical components 13A are rigidly connected to the body carriage assembly 12. The rigid frame assemblies 13 allow for the resisting of lateral loads imposed on the structure 11. The primary leveling pads 34 are positioned directly under the vertical component 13A of the rigid frame assemblies 13 (see FIG. 4) A fixed end wall panel assembly 15 is located within the width of the clear opening of the rigid frame assembly 13.

Foldable end wall panel assemblies 21 are vertically hinged to a face of the vertical component 13A that is offset from the interior plane of the fixed end wall panel 15 (See also FIG. 2.) The foldable end wall panel assemblies comprising of longitudinal metal track channels 21A with integral compressible weather-strip, metal 'I' stud framing 21B, rigid insulation 21C is installed to a thickness that would provide at least a R-20 insulation value and is mounted in-between the metal 'I' stud framing 21B.

The rigid insulation 21C has a layer of aluminum disposed to the interior plane of the wall when deployed. The aluminum layer is of sufficient thickness to satisfy model code requirements for a thermal barrier to the rigid insulation. Added benefits of the aluminum layer are weight savings as compared to a gypsum wall panel finish while also providing a non-organic, hygienic material that is not susceptible to mold growth or off-gassing as well as being easy to clean.

The exterior skin consists of a monolithic sheet of fiberglass siding 21F adhered to a structural diaphragm substrate 21D such as plywood. An integral counter flashing 21E is located near the base of the wall in the deployed position and provides for weather tightness when it laps over the floor extrusion trim 65. The fiberglass siding 21F is broken longitudinally so as to lap a vertical leg of the counter flashing 21E.

Figure 4:
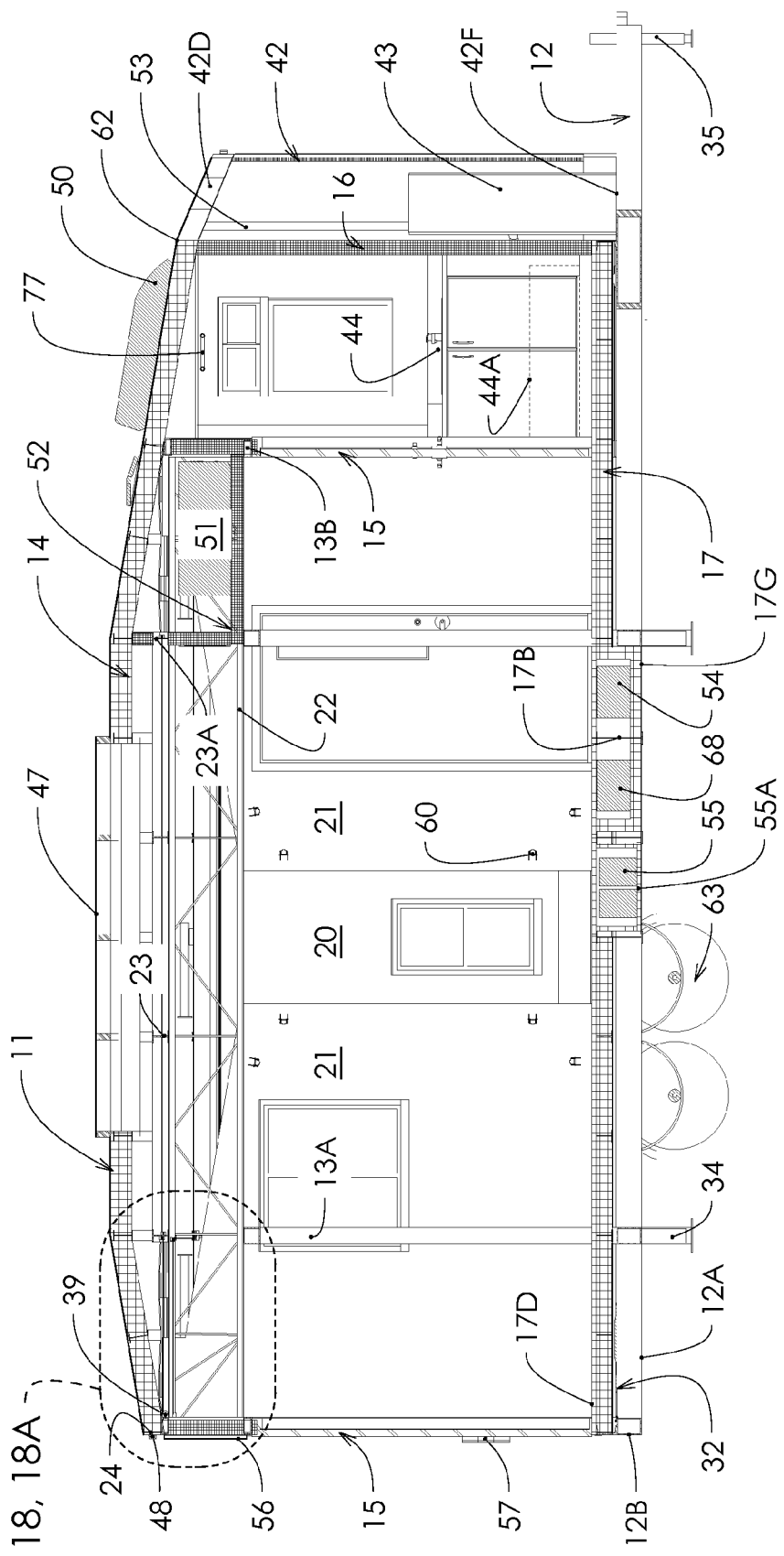
FIG. 4 is a longitudinal sectional/elevation view of the mobile structure shown in FIGS. 1 and 2.

A fixed floor panel assembly 17 is bolted to the body carriage 12. The fixed floor panel assembly 17 has a bolted, perimeter metal channel 17A, metal joists 17B shown in (FIG. 4) are secured by screws to a continuous ledger raceway 17F. The ledger raceway 17F provides a datum elevation for the bottom flange of the metal joists 17B to attach to as well as providing a protected conduit space for utility runs such as electrical wiring. A metal clip 17H (not shown) secures the joists 17B from overturning. The ledger raceway 17F is welded to the inside of the perimeter metal channel 17A. Rigid insulation 17C is installed to a thickness that would provide at least a R-20 insulation value and is mounted in-between the metal joists 17B shown in (FIG. 4). The rigid insulation 17C has an exterior layer of aluminum disposed to the exterior plane that would provide protection from road travel and the elements. The protective aluminum layer would be visible on the underside of the fixed floor panel assembly 17.

A removable floor diaphragm 17D made of metal is screwed to the perimeter metal channels 17A and the metal joists 17B shown in (FIG. 4) and contains within its depth a portion of the closed loop floor plumbing system 17E.

A dropped utility metal floor 17G is shown supporting the energy storage equipment 55. A floor hinge 29 is mounted longitudinally to the outside of both longitudinal sides of the metal channel 17A allowing for the deployment of the foldable floor panel assembly 19. The foldable floor panel assembly has a bolted perimeter metal channel 19A, metal joists 19B (not shown) are secured by screws to a continuous ledger raceway 19F. The ledger raceway 19F provides a datum elevation for the bottom flange of the metal joists 19B to attach to as well as providing a protected conduit for utility runs such as electrical wiring. The ledger raceway 19F is welded to the inside of the perimeter metal channel 19A.

Rigid insulation 19C is installed to a thickness that would provide at least a R-20 insulation value and is mounted inbetween the metal joists/blocking 19B. The rigid insulation 19C has an exterior layer of aluminum disposed to the exterior plane and would provide protection from daily use as well as from the elements. The protective aluminum layer would be visible on the underside of the foldable floor panel assembly 19.

A removable floor diaphragm 19D made of metal is screwed to the perimeter metal channel 19A and the metal joists/blocking 19B and contains within its depth a portion of the closed loop floor plumbing system 19E. A floor hinge 29 is mounted to one longitudinal side of the metal channel 19A. A collapsible ballast assembly 32 is hinged to the three perimeter metal channels 19A that are not directly attached to the fixed floor panel assembly 17 via the floor hinge 29 and floor extrusion trim 65, is mounted to the exterior faces of these three same perimeter metal channels 19A. The secondary leveling pads 35 are rotated 90° from their deployed relationship to the foldable floor panel assembly 19 while they are in non-deployed or transport mode. They are mounted over the floor extrusion trim 65 and bolted through to the outermost longitudinal perimeter metal channel 19A of the foldable floor panel assembly 19.

A foldable side wall panel assembly 20 consisting of longitudinal metal track channels 20A with integral compressible weather-strip, metal stud 'I' framing 20B, rigid insulation 20C is installed to a thickness that would provide at least a R-20 insulation value and is mounted in-between the metal stud framing 20B. The rigid insulation 20C has a layer of aluminum disposed to the interior plane of the wall when deployed. The aluminum layer is of sufficient thickness to satisfy model code requirements for a thermal barrier to the rigid insulation. The exterior skin of fiberglass siding 20F is adhered to a structural diaphragm substrate 20D such as plywood.

An integral counter flashing 20E is located near the base of the wall in the deployed position and provides for weather tightness when it laps over the floor extrusion trim 65. The fiberglass siding 20F is broken longitudinally so as to lap a vertical leg of the counter flashing 20E. Outside corner trim 20G (not shown see FIG. 5) provides weather tightness by lapping an edge of the foldable end wall panel assembly 21. The foldable sidewall assembly 20 is disposed adjacent to the foldable floor panel assembly 19 and connected by a horizontal wall hinge 30 to the foldable floor panel assembly 19.

A foldable roof panel assembly 18 has skewed metal angles 18A along both longitudinal edges, metal rafters/blocking 18B, rigid insulation 18C is installed to a thickness that would provide at least a R-30 insulation value and is mounted inbetween the metal rafters 18B. The rigid insulation 18C has a layer of aluminum disposed to the interior plane of the wall when deployed. The aluminum layer is of sufficient thickness to satisfy model code requirements for a thermal barrier to the rigid insulation.

A walk able roof surface is comprised of a flexible roof membrane 18E adhered to a structural diaphragm substrate 18D such as plywood. The foldable roof panel assembly 18 is bolted to the roof overhang assembly 27 through a skewed metal angle 18A. The bottom of the roof overhang assembly 27 is offset from the interior plane of the foldable roof assembly 18 creating a stop for the deployed foldable side wall assembly 20, an auxiliary metal angle 18F attached to the interior plane of the foldable roof panel assembly 18 and is disposed so as to create a second stop for the deployed foldable side wall assembly 20.

End wall counter flashing 18J provides weather tightness between the foldable roof panel assemblies 18 to the foldable end wall panel assemblies 21. The opposing skewed metal channel 18A is screwed to a plurality of roof hinges 28 that are spaced at intervals along the longitudinal edges of the fixed roof panel assembly 14. Insect screening is installed between the roof hinges 28 that provide ventilation while the structure 11 is being transported and/or stored. The fixed roof panel assembly 14 is comprised of metal rafters 14A screwed to a skewed leg of the edge angle 24 at the fascia locations. At the venting skylight 47, the rafters are supported by a header angle 14B. Rigid insulation 14C is installed to a thickness that would provide at least a R-30 insulation value and is mounted in-between the metal rafters 14A. The rigid insulation 14C has a layer of aluminum disposed to the interior plane of the wall when deployed. The aluminum layer is of sufficient thickness to satisfy model code requirements for a thermal barrier to the rigid insulation.

A walk able roof surface is provided by a flexible roof membrane 14E material adhered to a structural diaphragm substrate 14D such as plywood. The membrane 14E and diaphragm substrate 14D remain integral and cover the fascia of the fixed roof panel assembly 14 where the materials terminate in drip edge trim 14F. Two longitudinal roof support 22 elements are rigidly fixed and supported by the rigid frame assemblies 13, lateral roof support 23 elements are rigidly fixed to the longitudinal roof supports 22 and substantially provide support to the edge angle 24. Intermediate metal rafters 14A located between the lateral roof support 23 elements utilize support-blocking 25 that are screwed to the webs of the lateral roof support 23 elements. A cabling and pulley system assembly 39 is shown holding the foldable roof panel assembly in a secure position while in transport or non-deployed mode.

FIG. 4 is a longitudinal sectional view of the mobile, expandable, structure 11 in transport or non-deployed mode. A body carriage assembly 12 provides mounting for the wheel/axle assembly 63. A fixed floor panel assembly 17 is bolted to the body carriage assembly 12. Increased depth metal 'I' joists 17B support a utility metal floor 17G creating the compartments for the fresh water vessel 54, energy storage equipment 55 and the hydronic heating water vessel 68. Isolation mounts 55A provide shock protection for the energy storage equipment 55. Perimeter insulation protects vessels 54 & 68 from extreme temperatures. A plurality of vertical components 13A is rigidly connected to the body carriage assembly 12 at their base.

Primary leveling pads 34 are located under the two interior rigid frame assemblies 13. The horizontal component 13B of the rigid frame assemblies 13 are rigidly connected to the longitudinal roof supports 22. A plurality of lateral roof supports 23 and lateral roof supports with pulley housing 23A provides support to the fixed roof panel assembly 14 which has a venting skylight 47 shown. Foldable end wall panel assemblies 21 and the foldable sidewall panel assembly 20 are shown. A foldable roof closure panel assembly 56 provides weather protection for the structure 11 in both transport and deployed mode.

Figure 5:
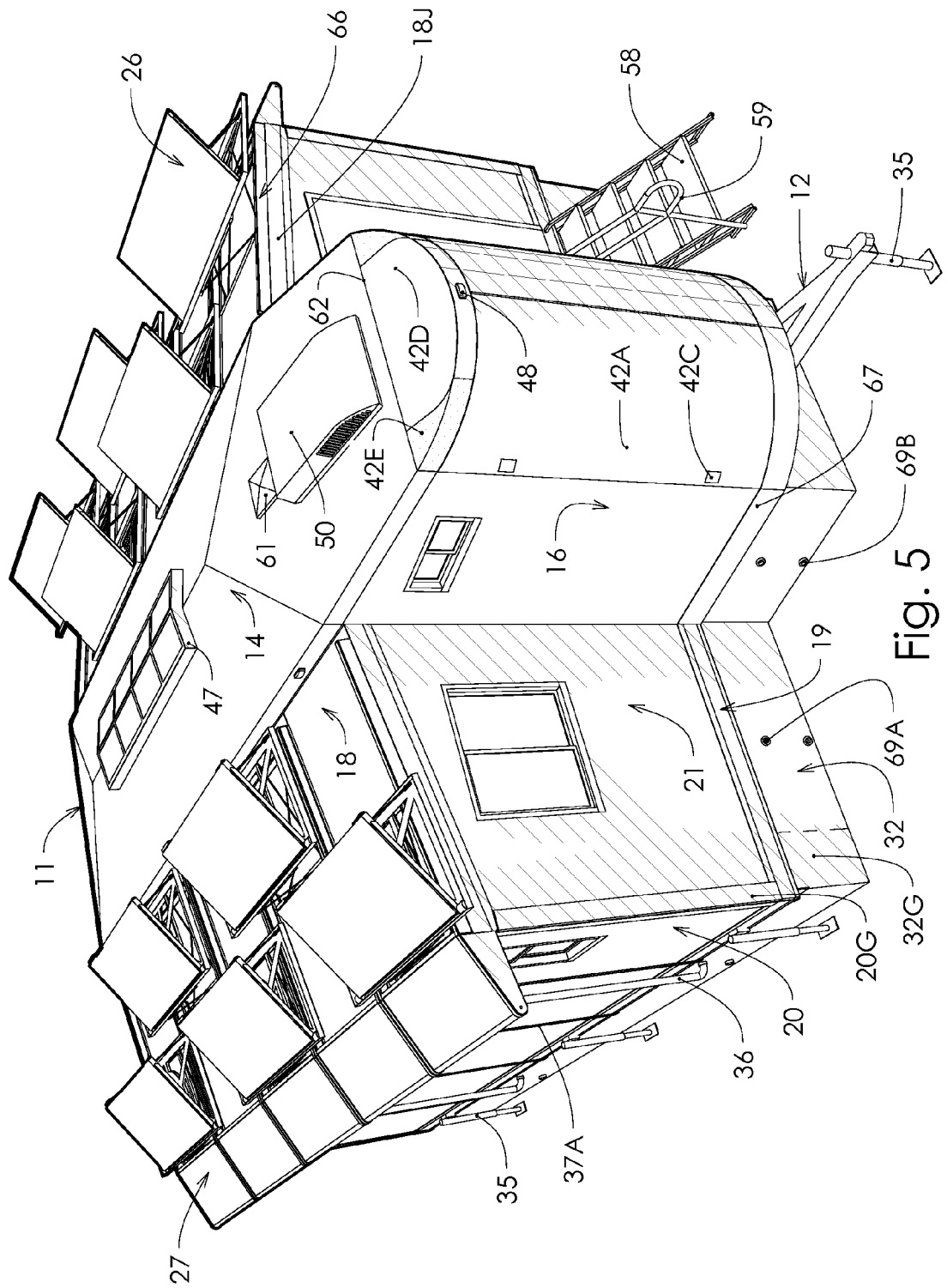
FIG. 5 is a perspective left-side front view of a mobile structure constructed in accordance with the invention, showing the invention in a deployed mode.

FIG. 5 is a perspective left-side front view of the mobile, expandable, structure 11 in the deployed mode. Foldable end wall panel assemblies 21 are shown deployed adjacent to the fixed wall panel assemblies 16 and the forward enclosure assembly 42 that make up the front or leading end of the structure 11. Foldable side wall panel assemblies 20 are disposed perpendicular to the foldable end wall panel assemblies 21 and are counter flashed by the outside corner trim 20G. Foldable roof panel assemblies 18 are hinged to the fixed roof panel assembly 14. End wall counter flashing 18J provides weather tightness between assemblies 18 and 21.

Energy collector assemblies 26 feature the energy collector panel's 26A rotated 90° from their transport position, showing flexibility in positioning for optimum solar gain. Roof overhang assemblies 27 provide sun shielding and provide a housing for the retractable screen assembly 46 as well as an integral gutter 27G (46 and 27G not shown see FIG. 13).

A retractable closed loop cable/cross rod 37A is shown securing the foldable roof panel assembly 18 to the foldable floor panel assemblies 19. The closed loop cable 37A terminates at bottom outside corner of the foldable floor panel assembly 19 via a tension paddle 37D and handle/lock 37F (19, 37D and 37F not shown see FIG. 12).

A perimeter ballast assembly 32 holds both fresh and gray water in separate flexible membranes. The weight of the water is an aid to counter wind up-lift forces on the structure while also providing substantial increases in water holding capacity when deployed. A fabric access panel 32G provides access to removable series ballast plumbing 69 (not shown, see FIG. 12) Fill/overflow 69A ports and drain 69B ports provide a means for water transference to/from the ballast assembly 32. Downspouts 36 provide a means to reclaim rainwater and divert the water to the ballast assemblies 32. Secondary leveling pads 35 are mounted to the structure 11 providing additional support. A collapsible stair 58 with a removable handrail 59 are shown at the far right hand side of the figure and provide for a second means of egress.

Figure 6:
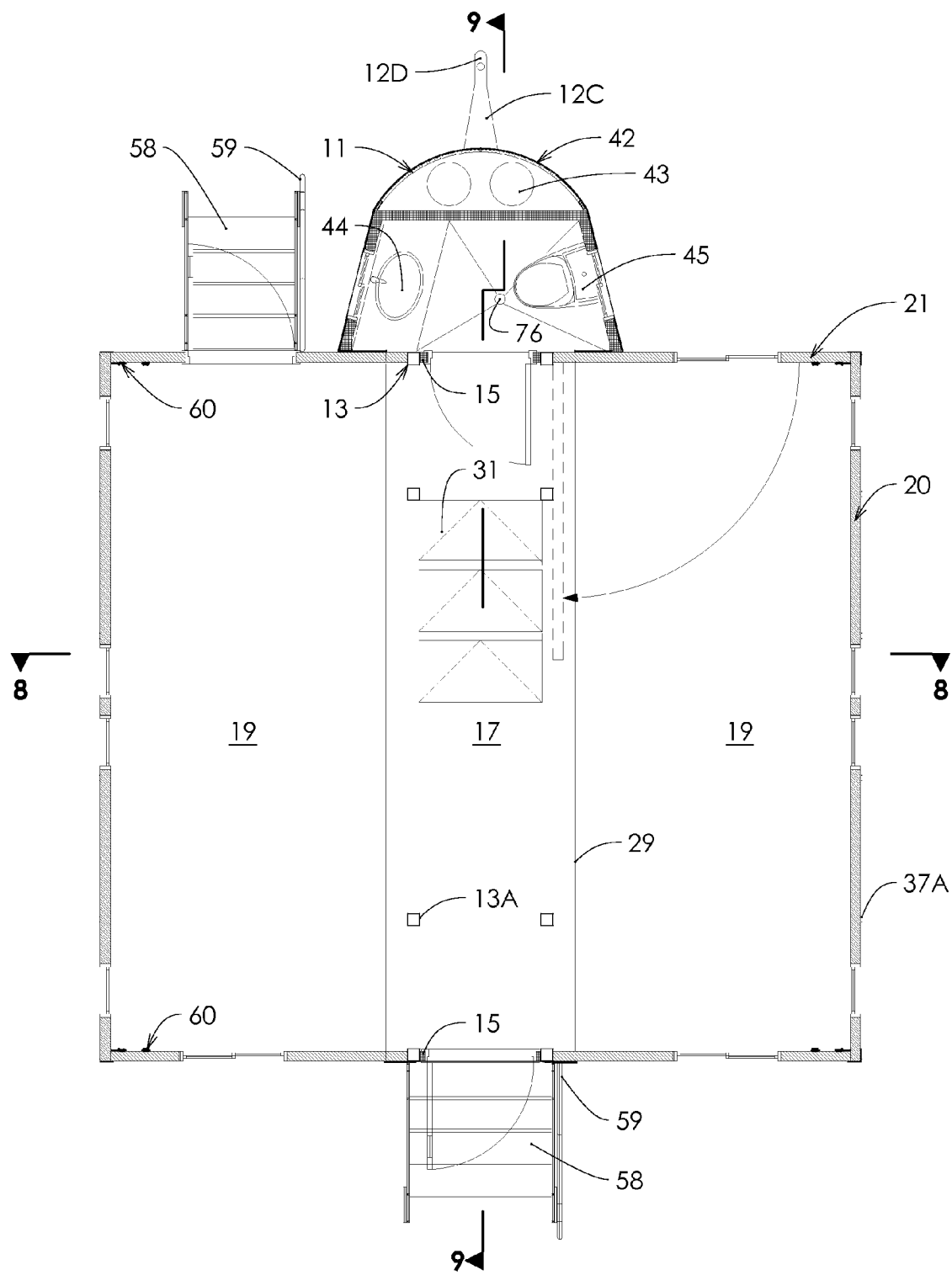
FIG. 6 is a plan view of the mobile structure shown in FIG. 5.

FIG. 6 is a plan view of the structure 11, while in a deployed mode. A plurality of rigid frames 13 and a fixed floor panel assembly 17 are secured to the body carriage assembly 12. Fixed wall panels 16 extend obliquely from the fixed end wall panel 15 and when joined with an additional fixed wall panel 16 disposed adjacent to the forward enclosure assembly 42 provide an enclosure of insulted space where the sink/lavatory 44 and incinerating toilet 45 are located. The foldable floor panel assemblies 19 utilize a floor hinge 29 for a connection to the fixed floor panel assembly 17.

A plurality of foldable sidewall panel assemblies 21, are hinged to the vertical component 13A of the rigid frame assemblies 13. End wall tension tie assemblies 60, secure the non-fixed end of the end wall panel assemblies 21 to the foldable sidewall panel assemblies 20. A horizontal wall hinge 30, secures the foldable sidewall panel assemblies 20 to the foldable floor panel assemblies 19 along their adjacent edges. A pair of collapsible stairs 58 with removable handrails 59 is shown and provides a means of egress.

Figure 7A:
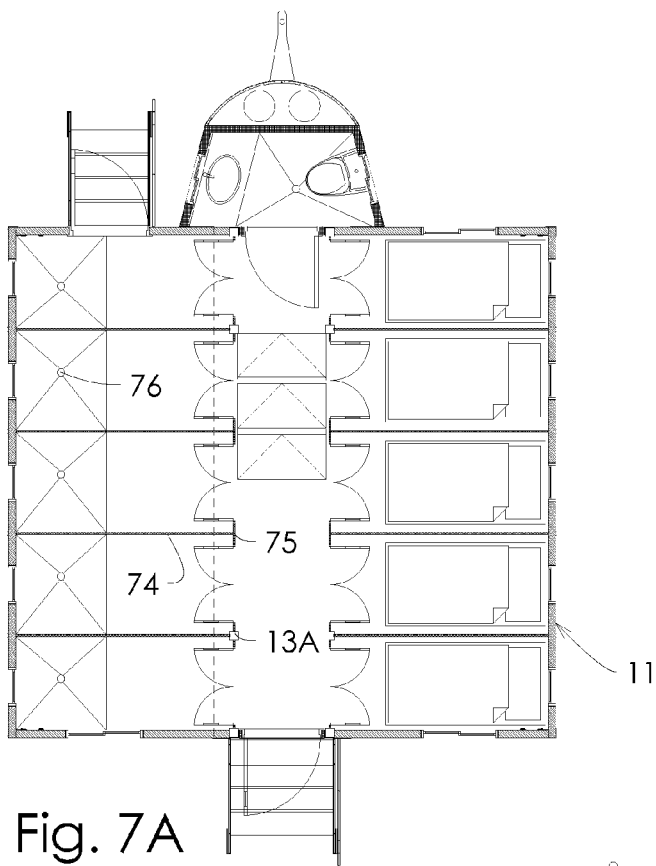
FIGS. 7 and 7A are plan views of the deployed mobile structure showing flexibility of plan configurations through use of the removable interior partitions.
Figure 7:
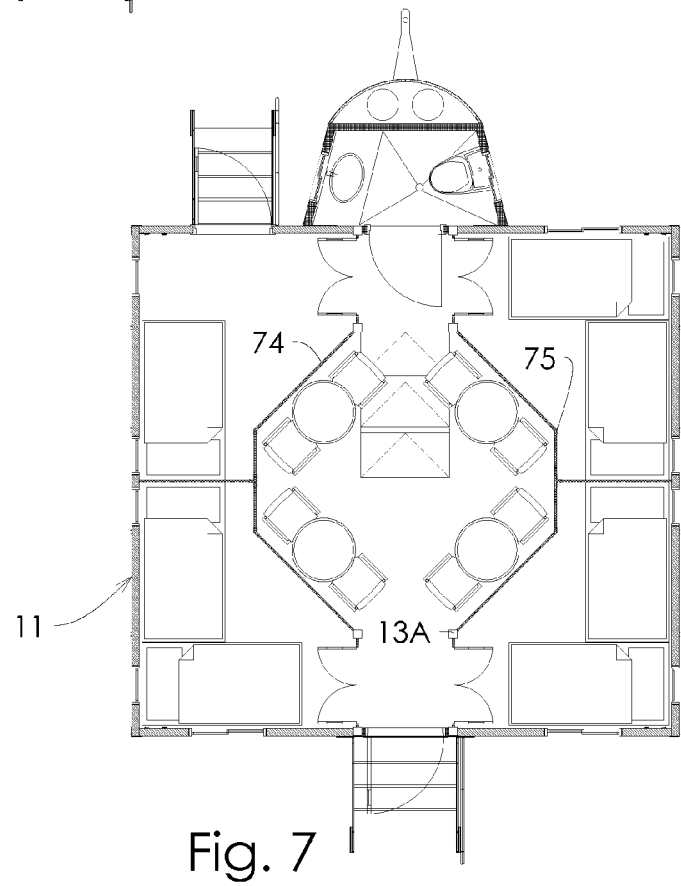

FIG. 7 is a plan view of the structure 11, while in a deployed mode. The configuration creates a central octagonal shaped space located primarily under the venting skylight 47. Four separate suites are also created for uses such as in a clinic, sleeping rooms or office space. Interior partitions 74, similar to modern office environments are secured to the vertical components 13A of the rigid frame assemblies 13. Additional extruded metal supports 75 are utilized at the remaining junctures of the interior partitions 74. Electrical feeds up through the extruded metal supports 75 as well as the rigid frame assemblies 13, lend additional flexibility.

FIG. 7A is a plan view of the structure 11, while in a deployed mode. The configuration creates a central corridor lit by the venting skylight 47. Five rooms on either side of the corridor can accommodate single beds to house the homeless or for temporarily displaced people such as in events local or national emergencies. Shown on the left side of the central corridor is an alternative embodiment with the individual spaces have been modified for use as shower facilities with heated water generated by the energy collector assemblies 26 and waste-water redirected to the ballast assemblies 32. Interior partitions 74 are secured to the vertical component 13A of the rigid frame assemblies 13. Additional extruded metal supports 75 are utilized at the remaining junctures of the interior partitions 74.

Figure 8:
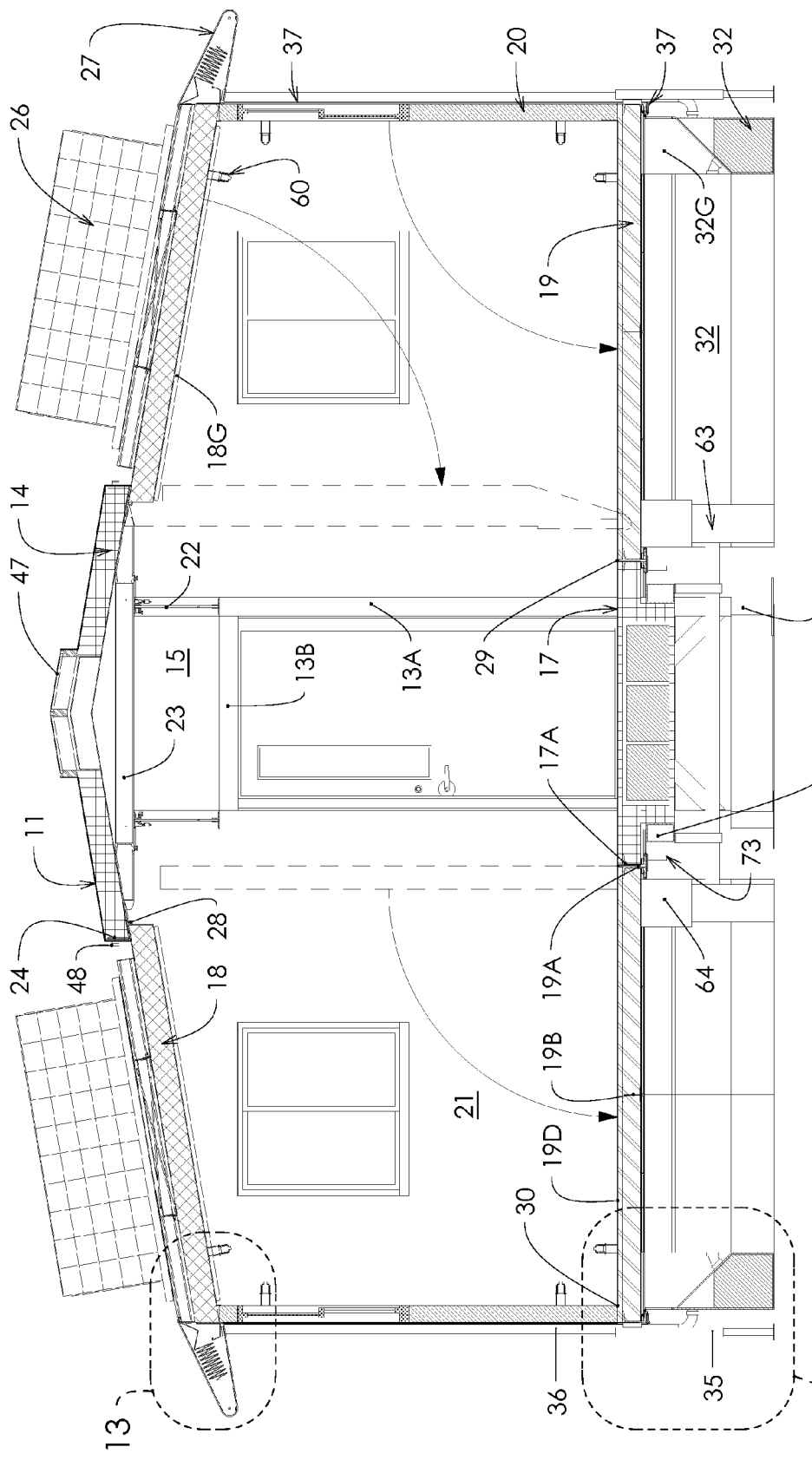
FIG. 8 is a lateral cross-sectional/elevation view of the mobile structure shown in FIGS. 5 and 6

FIG. 8 is a lateral cross-section/elevation view of the mobile, expandable, structure 11, while in a deployed mode. Longitudinal beams 12A provide a mounting surface for the wheel/axle assembly 63. The collapsible ballast assembly 32 is shown deployed (see FIG. 12 for additional information.) A plurality of hinged floor tie assemblies 73 secure the foldable floor panel assemblies 19 to the fixed floor panel assembly 17 along their shared longitudinal edges.

A metal stop spaced at intervals along the bottom outside edge of the perimeter metal channel 17A provides a means for obtaining flush floor relationships between the fixed and foldable floor panels while a continuous compressible insulation strip seals the juncture of the opposing perimeter metal channels 17A and 19A. A floor hinge 29 provides a longitudinal pivot point for the opposing fixed and foldable floor panels. Sidewall panel assemblies 20 are positioned perpendicular to and secured by a horizontal wall hinge 30 to the foldable floor panel assemblies 19. Primary leveling pads 34 and secondary leveling pads 35 are shown deployed adding support and allowing adjustments for various grade elevations.

Foldable end wall panel assemblies 21 are vertically hinged to a face of the vertical component 13A that is offset from the interior plane of the fixed end wall panel 15 (See also FIG. 2.) Foldable roof panel assemblies 18 are supported by a plurality of roof hinges 28 at their juncture to the fixed roof panel assembly 14.

Assembly 18 holds the assemblies 20 and 21 in place by an auxiliary metal angle 18G on the interior side of the structure 11. The roof overhang assembly retains the exterior side of assembly 20 in place via a mounting panel 27H (18G and 27H shown in FIG. 13).

A plurality of end wall tension tie assemblies 60 provide a means of tying assemblies 18 to 21, assemblies 20 to 21 and assemblies 19 to 21 when in a deployed mode. The roof overhang assembly 27 (see also FIG. 13) shows the retractable screen assembly 46 substantially contained within its volume, allowing for deployment of the energy collector assembly 26.

Figure 9:
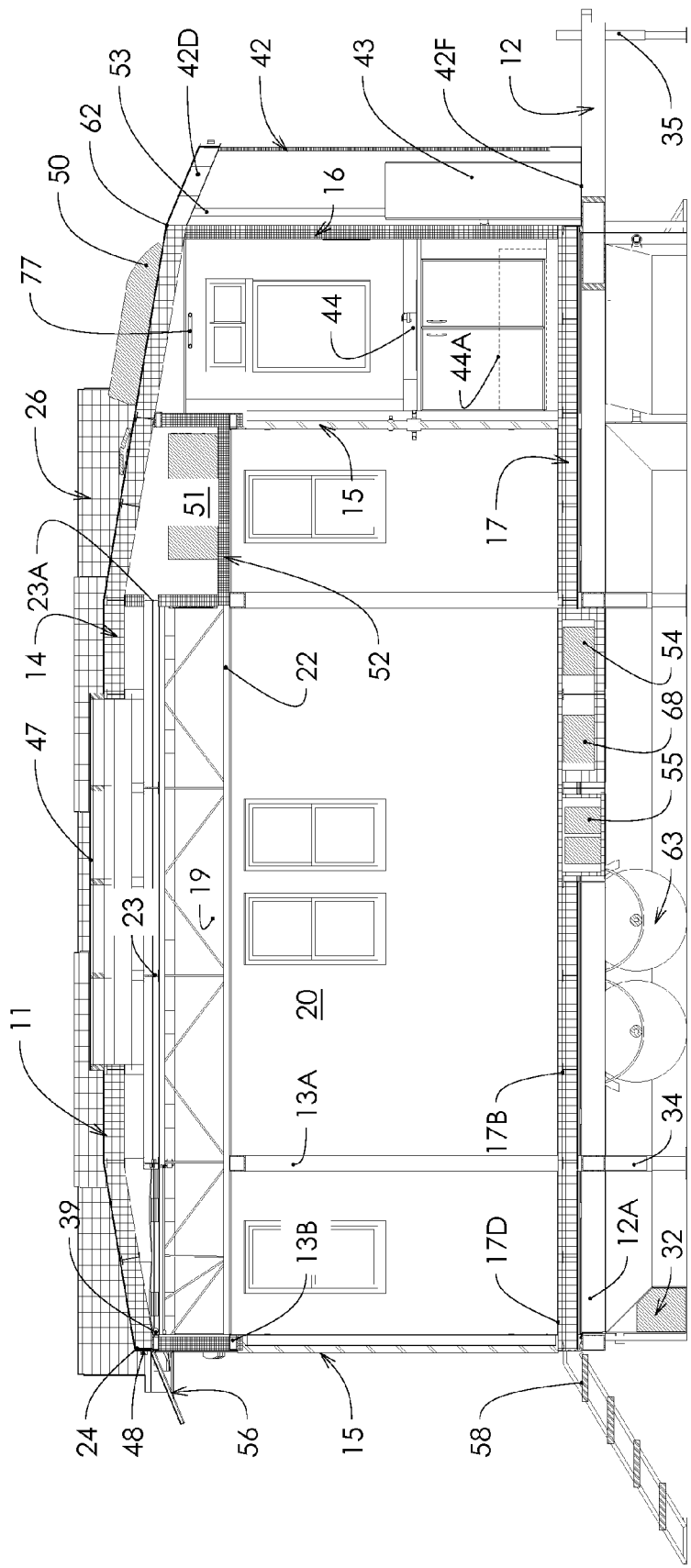
FIG. 9 is a longitudinal sectional/elevation view of the mobile structure shown in FIGS. 5 and 6

FIG. 9 is a longitudinal sectional view of the mobile, expandable, structure 11 in a deployed mode. Exterior ballast assemblies 32 and a collapsible stair 58 are shown deployed. The foldable sidewall panel assembly 20 is shown upright in its deployed position. A foldable roof panel 19 is shown obliquely. A foldable roof closure panel assembly 56 has an adjustable support angle and a guide at the fixed end wall panel assembly 15. Deployed energy collector assemblies 26 are shown in a position rotated 90° from their transport mode showing the flexibility of the sustainable, mobile, expandable structure 11.

FIG. 10 is a side elevation view of the mobile, expandable, structure 11 in a transport or non-deployed mode. The body carriage assembly 12 provides mounting for the wheel/axle assembly 63. Primary leveling pads 34 and secondary leveling pads 35 are shown retracted. The hinged floor tie assemblies 73 are shown on either side of the primary leveling pads 34. The forward closure assembly 42 abuts a fixed wall panel assembly 16 with a rock guard 67 at its base. Above the rock guard is the water fill/drain access panel with lock 70 as well as the electrical access panel with lock 71 for connections to utilities if required. The retractable screen assembly 46 has metal slats 46A that are contained in a reveal of the guide rail assembly 66. Assembly 46 protects from theft and the elements the underlying energy collector assemblies 26 during transport and storage modes. The fixed roof panel assembly 14 shows the venting skylight 47 as well as the remote air conditioning equipment 50 and the mechanical equipment vent 61.

FIG. 11 is a rear elevation view of the structure 11 in a transport or non-deployed mode. The foldable roof closure panel 56 is hinged to the fixed roof panel assembly 14 and provides protection from the elements. An access door is mounted in the fixed end wall panel assembly 15. Drive gears with locks 40 are used for deployment of the foldable roof panel assembly 18 and the foldable floor panel assembly 19.

A simple socket type tool with a lever handle is utilized to control the pulley and cabling system assembly 39 (see FIGS. 18 and 18A) that raises and lower assemblies 18 and 19. A fixed end wall base flashing 72 mounts to the transverse beams 12B of the body carriage assembly 12. End wall counter flashing 18J laps the floor extrusion trim 65 that is mounted to the foldable floor panel assembly 19. End wall flashing 41 protects the outside vertical edges of end wall panel assembly 15 and in turn is partially lapped by the floor extrusion trim 65 near its base. Drive gears with locks 40 are also shown on the end of the roof overhang assembly 27. A simple socket type tool with a lever handle is also used here to raise and lower the retractable screen assembly 46 shown in FIG. 10.

Figure 12:
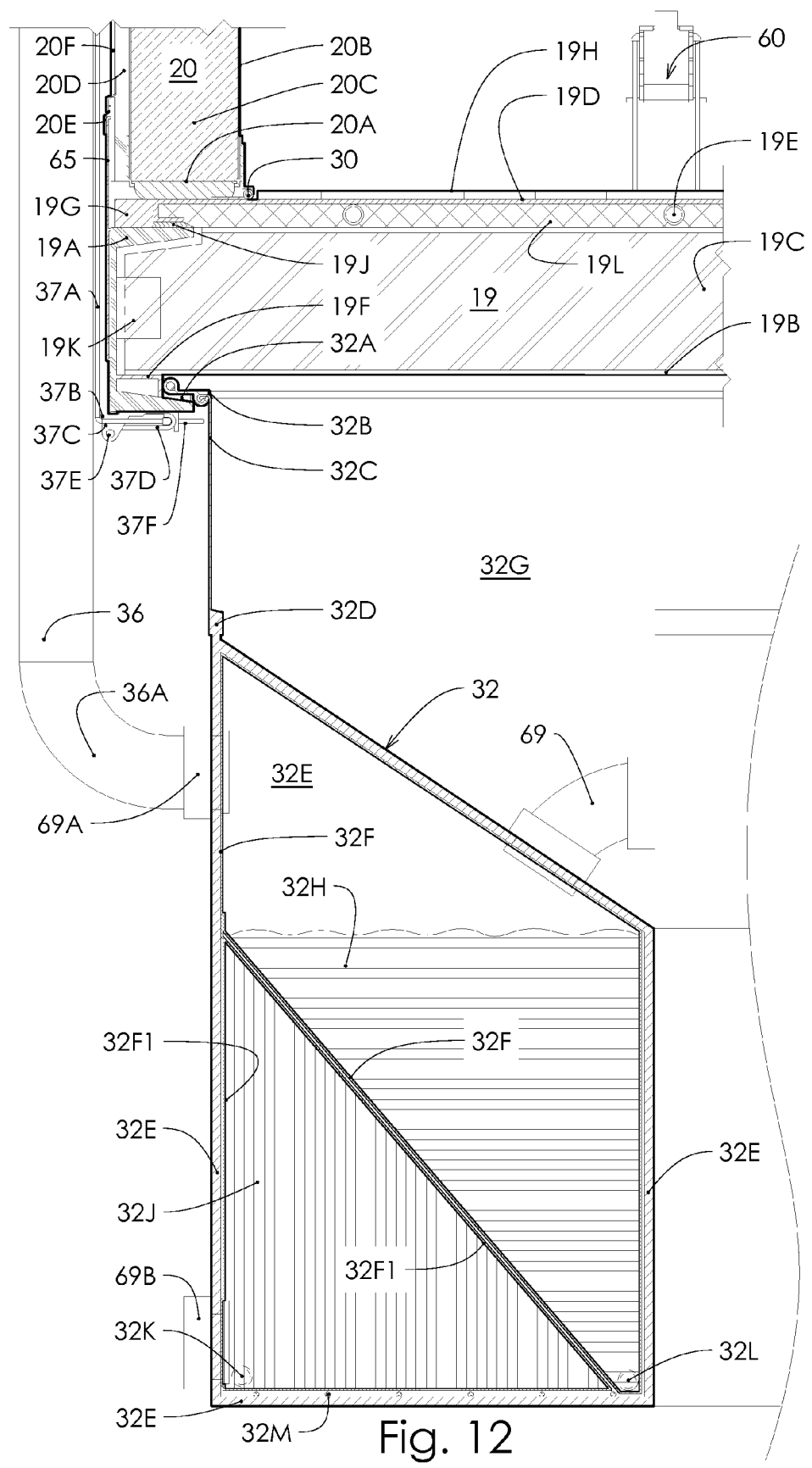
FIG. 12 is an enlarged detail view of the foldable wall, floor and ballast assemblies.

FIG. 12 is an enlarged detail view of the foldable wall panel assembly 20 connecting via the wall hinge 30 to the foldable floor panel assembly 19. The ballast assembly 32 mounts to the underside of the assembly 19. The secondary leveling pad 35 is omitted from this detail view for clarity of the remaining elements being described. The foldable side wall panel assembly 20 consisting of longitudinal metal track channels 20A with integral compressible weather-strip, metal stud 'I' framing 20B, rigid insulation 20C is installed to a thickness that would provide at least a R-20 insulation value and is mounted in-between the metal stud framing 20B.

The rigid insulation 20C has a layer of aluminum disposed to the interior plane of the wall when deployed. The aluminum layer is of sufficient thickness to satisfy model code requirements for a thermal barrier to the rigid insulation. The foldable wall panel consisting of a monolithic sheet of fiberglass siding 20F adhered to a structural diaphragm substrate 20D such as plywood.

An integral counter flashing 20E is located near the base of the wall in the deployed position and provides for weather tightness when it laps over the floor extrusion trim 65. The foldable floor panel assembly 19 has a bolted perimeter metal channel 19A, metal joists 19B are secured by screws to a continuous ledger raceway 19F. The ledger raceway 19F provides a datum elevation for the bottom flange of the metal joists 19B to attach to as well as providing a protected conduit for utility runs such as electrical wiring. The ledger raceway 19F is welded to the inside of the perimeter metal channel 19A.

A metal clip 19K is spot welded to the inside of the metal channel 19A and secures to the metal joists 19B by screws. Rigid insulation 19C is installed to a thickness that would provide at least a R-20 insulation value and is mounted in-between the metal joists/blocking 19B. The rigid insulation 19C has an exterior layer of aluminum disposed to the exterior plane and would provide protection from daily use as well as from the elements. The protective aluminum layer would be visible on the underside of the foldable floor panel assembly 19.

A removable floor diaphragm 19D made of metal is separated by thermal break 19J from the perimeter metal channel 19A and the metal joists/blocking 19B and contains within its depth a portion of the closed loop floor plumbing system 19E and insulation 19L. Perimeter insulation 19G provides an additional thermal break.

A finish floor material 19H is secured to the diaphragm 19D and is readily replaced or removed for cleaning. The closed loop cable/rod 37A is pulled down from the roof overhang assembly 27 (see FIG. 13) by a simple hooked tool to approximately the level of the bottom of assembly 19. The tension paddle 37D being in a non-deployed mode would be approximately parallel to the floor extrusion trim 65. A 'J' hook makes up the topmost end of the tension paddle 37D and secures the closed cable/rod within the 'J' hook. The tension paddle 37D is pivotally connected to the tension paddle hinge 37E and stretches the cable over the cable fulcrum 37B. The tension paddle is sprung into a fixed position by the back wall of the body 37C and then locked in place by the handle/lock 37F. The ballast assembly 32 is shown approximately half way through a transition from 100 % potable water to 50% potable water and 50% gray water being contained.

Assembly 32 consists of flexible body panels 32E comprising a bottom, four sides and a sloped top panel. When deployed the body panels 32 E define a volume that is initially filled with potable water 32H that is held within chamber membrane 32F. Keeping separate the gray water 32J contained within chamber membrane 32F1 that is released from the onboard gray water vessel 44A mounted under the sink/lavatory 44 or from floor drains 76. The gray water 32J displaces the potable water 32H in equal volumes through a capacity sensor and in line pumps (see also FIG. 19) The fixed gray water plumbing 32K and the fixed fresh water plumbing 32L are shown dashed near the base of the assembly.

Above the bottom ballast panel 32E is the electric resistance mat 32M fed from the energy storage equipment 55 to keep the water from freezing in cold climates. Near the bottom of the ballast assembly 32, a drain 69B is shown capped. Above this the downspout 36, utilizing a flexible leader 36A brings harvested rainwater to the fill/overflow 69A connection of the ballast assembly. If required, the leader 36A can be turned outward. The ballast neck 32D provides a reinforced seam to connect the ballast panels 32E to the adjustable leg panel 32C.

Leg panel 32C is flexible and is provided to address minor differences in grade that may occur upon deployment. Part 32C is released from the body 32B as required by grade changes. The body 32B is axially connected to the body mount 32A, which is secured to the ledger raceway 19F and a flange of channel 19A. Access panel 32G is shown beyond (see also FIG. 5) allowing deployment of the field installed series ballast plumbing 69 allowing the potable water to fill up the remaining chamber membranes 32F such as when space does not allow easy access around the structure 11.

Figure 13:
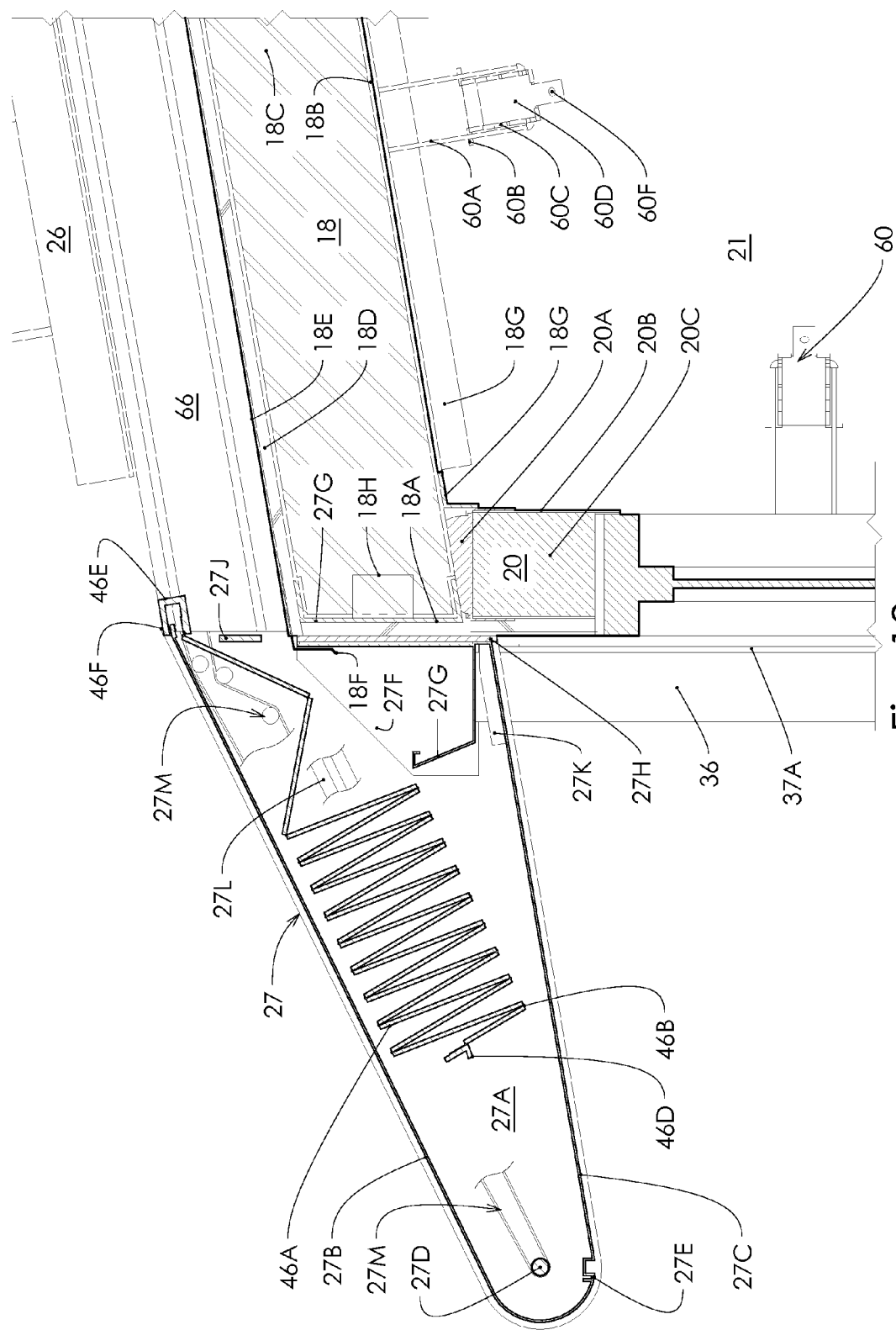
FIG. 13 is an enlarged detail view of the foldable wall, roof and overhang assemblies.

FIG. 13 is an enlarged detail view of the foldable roof panel assembly 18 fixing the top of the foldable wall panel assembly 20 in place. A roof overhang assembly 27 is shown with elements of the retractable screen assembly 46 contained therein. The guide rail assembly 66 is shown providing support to the energy collector assembly 26.

A foldable roof panel assembly 18 has skewed metal angles 18A along both longitudinal edges, metal rafters/blocking 18B, rigid insulation 18C is installed to a thickness that would provide at least a R-30 insulation value and is mounted in-between the metal rafters 18B. The rigid insulation 18C has a layer of aluminum disposed to the interior plane of the wall when deployed. The aluminum layer is of sufficient thickness to satisfy model code requirements for a thermal barrier to the rigid insulation.

A walk able roof surface is comprised of a fire resistant flexible roof membrane 18E adhered to a structural diaphragm substrate 18D such as plywood. The foldable roof panel assembly 18 is bolted to the roof overhang assembly 27 through a skewed metal angle 18A connecting to threaded studs welded to the face of the mounting panel 27H. Metal clip 18H is welded to channel 18A and secures the web of part 18B by means of screws. The bottom of the roof overhang assembly 27 is offset from the interior plane of the foldable roof assembly 18 creating a stop for the deployed foldable side wall assembly 20, an auxiliary metal angle 18G attached to the interior plane of the foldable roof panel assembly 18 is disposed so as to create a second stop for the deployed foldable side wall assembly 20 as well as assembly 21 beyond.

Metal track channel with an integral weather strip 20A is shown compressed at the top of assembly 20. End wall counter flashing 18J (see FIG. 5) provides weather tightness between the foldable roof panel assembly 18 and the foldable end wall panel assemblies 21. A plurality of end wall tension tie assemblies 60 provide a means of tying assemblies 18 to 21, assemblies 20 to 21 and assemblies 19 to 21 when in a deployed mode. Assembly 27 consisting of a tapered end panel 27A at opposing ends of the modular unit. An operable top panel 27B utilizes hinge 27E for access to the interior volume that is substantially defined by the addition of the fixed soffit panel with drip 27C.

Mounting panel 27H provides a means for mounting assembly 27 to assembly 18, while cross brace 27J adds rigidity. A continuous drive rod 27D is driven by the drive gear/lock 40 (see FIG. 11) a closed loop cable/pulley assembly 27M consisting of four pulleys and a closed loop cable. Three pulleys shown are mounted to the face of panel 27A and a return pulley (not shown) is mounted to the interior side of end cap 66B of the guide rail assembly 66. The cable is put in motion by the turning of the drive rod 27D and allows for retraction and deployment of assembly 46.

Assembly 46 consisting of metal slats 46A, longitudinal hinge 46B, center pivot 46C, panel stop 46D and the panel head 46E. A slat guide channel 27L is configured to the inside walls of the tapered end panels 27A and provide a track to contain center pivot 46C. The channel 27L directs assembly 46 to the top most reveal of the extrusion contained within assembly 66 where it can travel to protect the energy collector assembly 26 as required. A void 27F, in part 27A allows for an interlocking gutter 27G to run continuous within multiple assemblies of assembly 27. Downspout 36 redirects harvested water to the ballast assemblies 32 (see FIG. 12) Below the gutter and mounted adjacent to panel 27A is the retractable cable closure assembly 27K providing tension for the closed cable/rod 37A of the roof to floor tension tie assembly 37. A simple hooked tool procures the cable/rod 37A from its retracted position adjacent to panel 27C near the bottom of the mounting panel 27H. Part 37A is pulled down and secured to the bottom of panel assembly 18 (see FIG. 12) providing a tension tie between the assemblies 18,19, 20 and 21.

Figure 14:
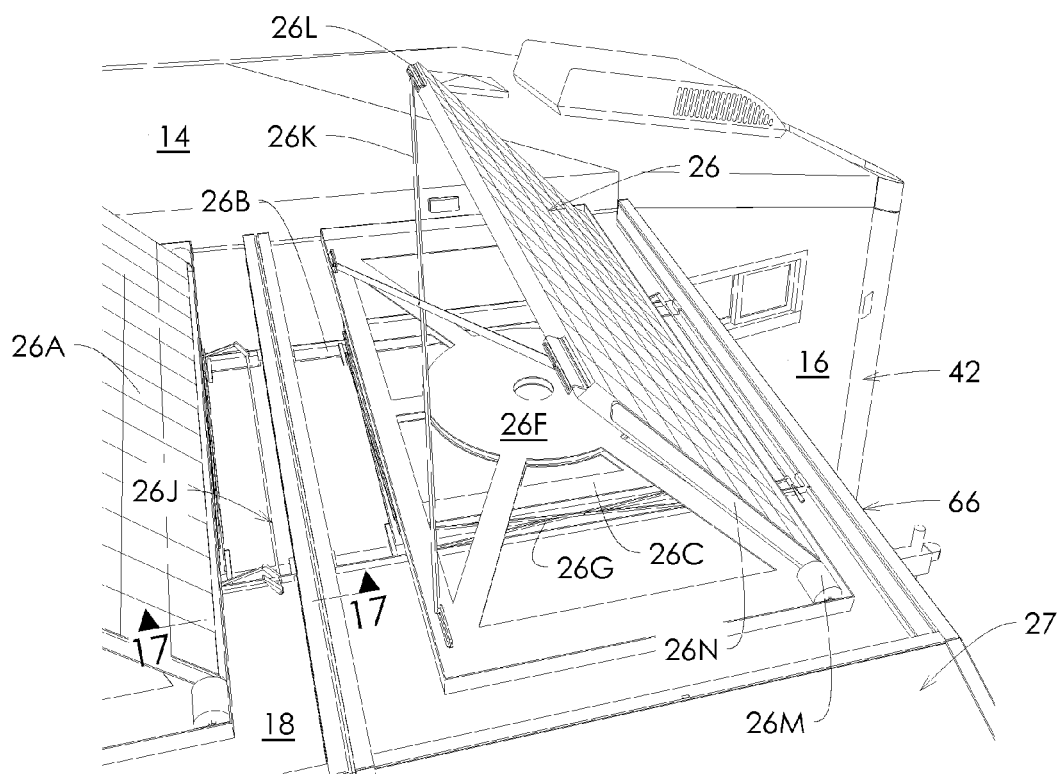
FIG. 14 is a perspective view of the energy collector assembly in one variation of deployment.

FIG. 14 is perspective view of a portion of structure 11 in a deployed mode. Energy collector assembly 26 is shown in a configuration with minimal adjustments made from its transport mode. A sliding base 26B consisting of two metal angles spanning perpendicular to assemblies 66 and connected by guide bars 26B-1 (not shown see FIG. 17) contained within the lower most reveal of assembly 66 and complete a frame that provides adjustment along the longitudinal axis of assembly 66. An adjustable lower bed 26C is raised from the lowest or transport mode of three possible elevations to the middle position by the elevation control assembly 26J (see also FIGS. 16, 17) allowing for the rotatable upper bed 26F to be at an elevation slightly higher than the top of assembly 66, adding additional flexibility in directional deployment.

A pair of primary torsion springs 26M connect to control arms 26N that fasten to opposing sides of the panel 26A and allow pitch adjustments by pivoting from the longitudinal hinge 26R not shown (see FIG. 17) Adjustable upper bed bracing 26K provides additional support by a pin that travels along a key of the hinged guide slots 26L that are positioned on the base of part 26F as well as at opposing ends of the panel 26A as shown.

Figure 15:
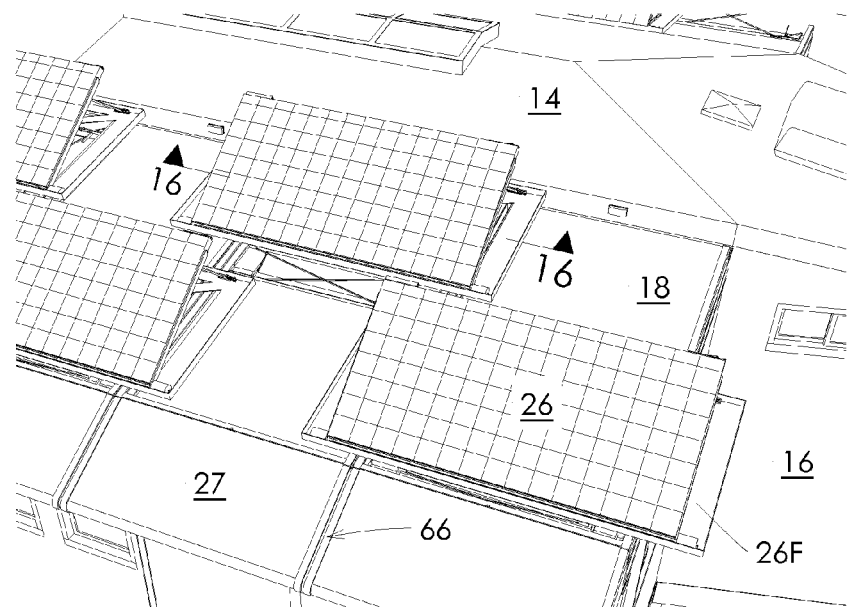
FIG. 15 is a perspective view of the energy collector assembly in an alternative variation of deployment.

FIG. 15 is perspective view of a portion of structure 11 in a deployed mode. Flexibility in deployment of the energy collector assembly 26 is shown through the 90° rotations from the panels in transport mode or that shown in FIG. 14. Panel assemblies 26 located adjacent to the roof overhang assembly 27 show the adjustable lower bed 26C is raised to the middle of three possible elevations, (see FIG. 17) allowing for the rotatable upper bed 26F to be at an elevation slightly higher than the top of assemblies 27 and 66. Panel assemblies 26 nearest the fixed roof panel 14 are raised to the highest of three possible positions allowing for deployment clearances as well as avoiding the sun shadow from the down slope assemblies.

Figure 16:
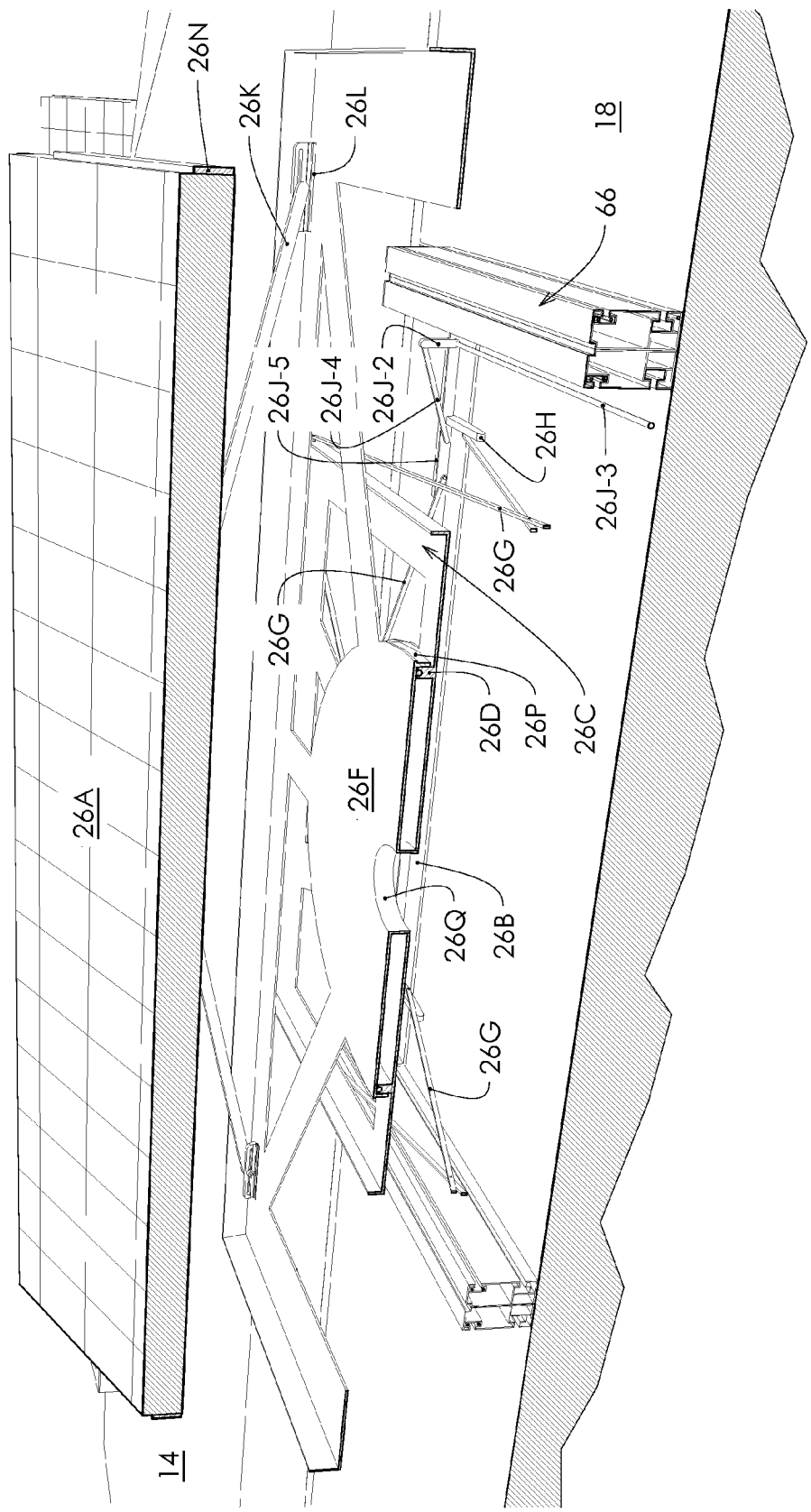
FIG. 16 is a sectional perspective view of the energy collector assembly shown in FIG. 15.

FIG. 16 is a sectional perspective view through the longitudinal axis of the energy collector assembly 26. The foldable roof panel assembly 18 is shown in partial section. A rotatable upper Bed 26F consists of a flat plate with voids creating a circular center with radiating legs integral to a perimeter bed angle substantially completing the upper bed 26F. Radius outer leg flashing 26P is disposed perpendicular to the outer edge of the circular flat plate center and features a keyed slot securing 26F to the adjustable lower bed 26C by means of the circular outer wall bearing 26D.

A radius inner leg flashing 26E is disposed perpendicular to the inner void of the circular flat plate center and keeps the assembly weather tight. Hinged guide slots 26L are screwed to the perimeter bed angle and secure pins of the adjustable upper bed bracing 26K. An angle of the sliding base 26B provides mounting and support for the adjustable lower bed bracing 26G guided by a pin that travels along a key of the bracing guides 26H positioned perpendicular to the longitudinal axis of the sliding base angles 26B.

The elevation control assembly 26J controls the elevation of the adjustable lower bed 26C and consists of a lever arm 26J-1 (see FIG. 17), two control arms 26J-2 fixed to a through rod 26J-3. Pinned arms 26J-4 have a guide pin disposed 90° from the face of the pinned arm and travel in slotted control housings 26J-5 (see FIG. 17) mounted to the exterior sides of the sliding base 26B. Voids in part 26B match those of the slotted control housings 26J-5 and allow for adjustment of the lower bed 26C.

Figure 17:
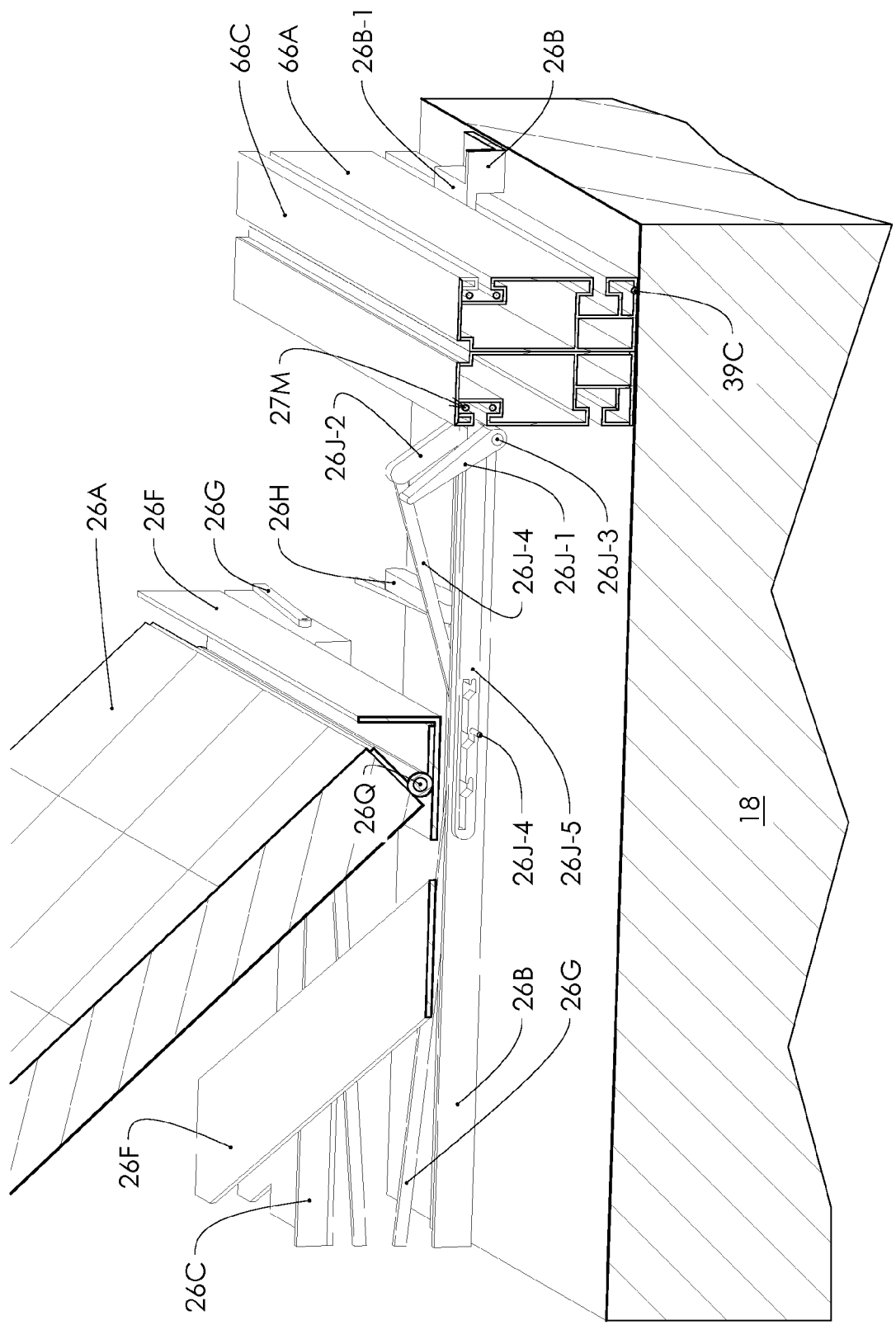
FIG. 17 is an enlarged sectional perspective view showing detail of the energy collector assembly and related assemblies shown in FIG. 14.

FIG. 17 is an enlarged sectional perspective view showing the elevation control assembly 26J controlling the energy collector assembly 26A which is supported by the guide rail assembly 66. The foldable roof panel assembly 18 is shown in partial section. Guide rail assemblies 66 are attached to tabs (not shown) fastened to the tops of metal rafters 18B, the roofing membrane 18E flashes the tabs while the assembly 66 counter flashes the tabs for weather tightness.

The elevation control assembly 26J controls the elevation of the adjustable lower bed 26C and consists of a lever arm 26J-1, two control arms 26J-2 fixed to a through rod 26J-3. Pinned arms 26J-4 have a guide pin disposed 90° from the face of pinned arm and travel in a slotted control housings 26J-5 mounted to the exterior sides of the sliding base 26B. Voids in part 26B match those of the slotted control housings 26J-5 and allow for adjustment of the lower bed 26C. A removable top cap 66C is secured with set screws to the extruded metal rail 66A allowing access to the cable pulley assembly 27M contained within the upper most reveal of the guide rail assembly 66 (see also FIG. 13.)

A cable 39C terminates at a fixed eye loop 39F that is secured to the end cap 66B of the guide rail assembly 66 (39F, 66B not shown). Cable 39C is controlled by the drive gear/lock 40 (not shown, see FIG. 11) and cabling system assembly 39 (see FIGS. 18, 18A.) Longitudinal hinge 26Q is screwed to the flat plate of rotatable upper bed 26F and provides a pivot point for pitch adjustments of the energy collector panel 26A.

Figure 18A:
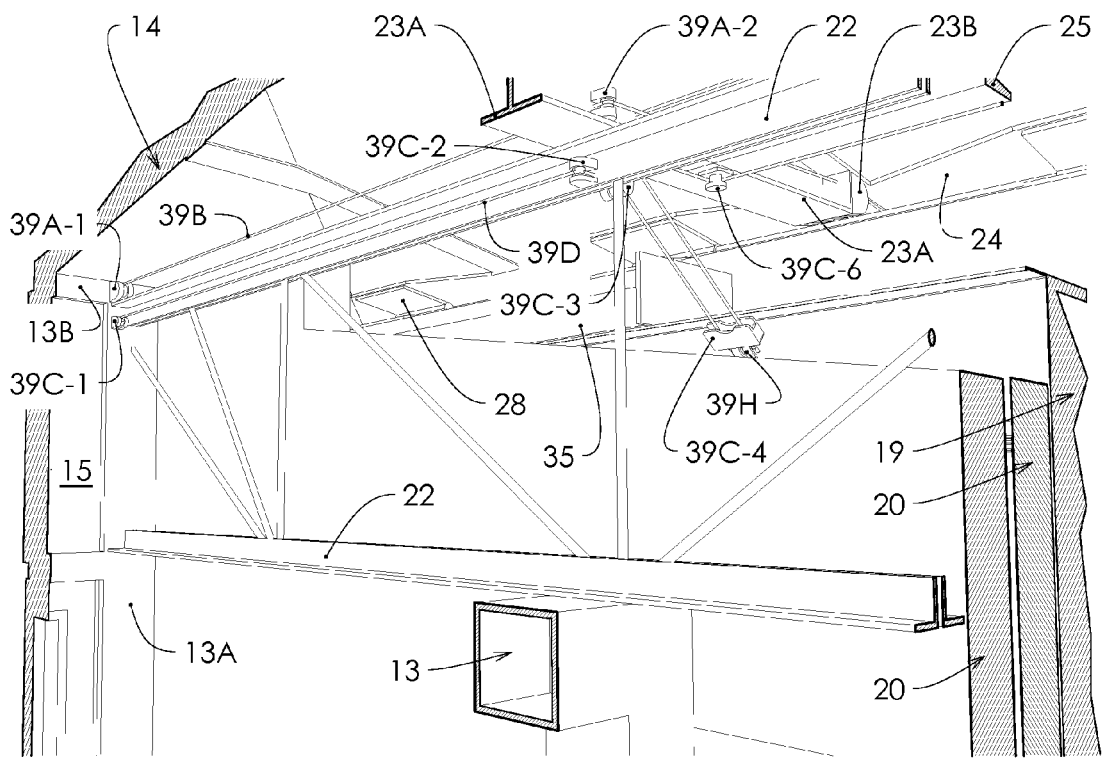
FIG. 18 and FIG. 18A are interior sectional perspectives showing the cabling system assemblies.
Figure 18:
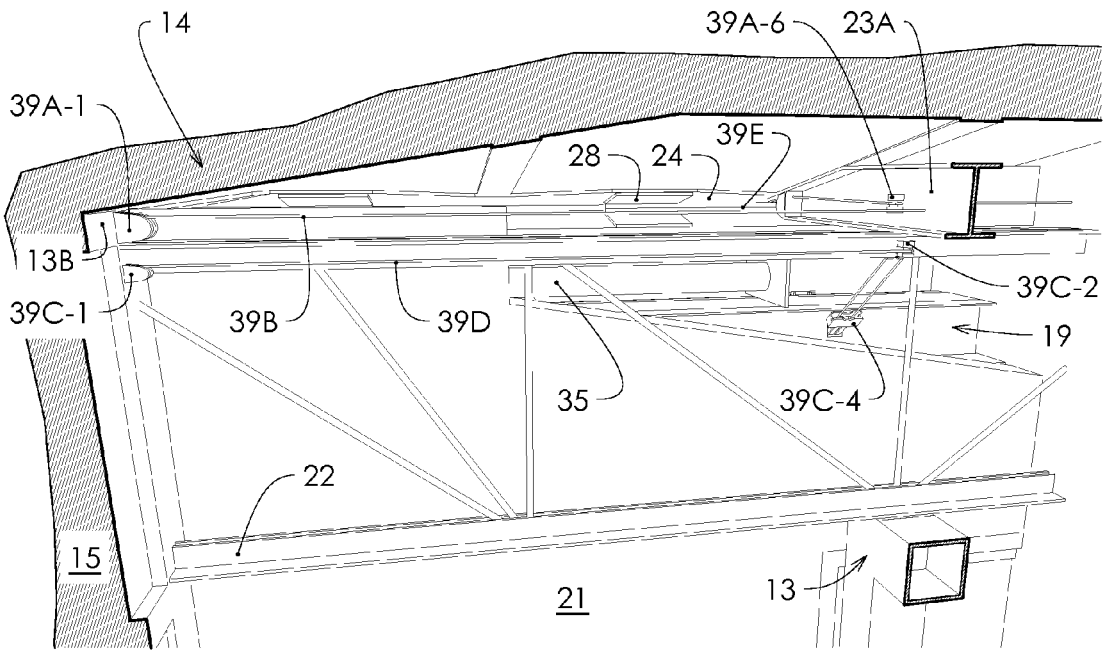

FIGS. 18 & 18A are interior sectional perspective views showing elements of the cabling system assembly 39 during transport mode. Structure 11 is partially shown cut through the fixed roof panel assembly 14 above and the fixed end wall panel assembly 15 on the left. In FIG. 18A the foldable assemblies 19, 20 and 21 are partially shown in section and provide a point of reference.

A foldable roof panel cable 39B is fixed to a drive gear/lock 40 (not shown, see FIG. 11.) The gear/lock 40 controls the deployment of the foldable roof panel assembly 18. Cable 39B is redirected 90° from a vertical orientation within the void of assembly 13 to a horizontal direction via roof drive pulley 39A-1 which is mounted to the face of horizontal component 13B of assembly 13. The cable 39B continues horizontally in tension and passes through the web of the lateral roof support with pulley housing 23A and turns 90° via pulley 39A-2 (39A-2 shown in FIG. 18A) the cable runs toward the housing panel 23B of part 23A where pulley 39A-3 (hidden behind housing panel 23B) alters the cable direction 90° to a downward direction after passing over the cable fulcrum 39E (see FIG. 18). The cable fulcrum comprised of a rotatable cylindrical bar aligned with the hinge pin of roof hinge 28. The cable 39B passes over grooves in the cylindrical bar keeping the cable properly aligned.

A return pulley 39A-4 (not shown, part 39A-4 is mounted to end cap 66B of the guide rail assembly) returns the cable 180° in an upward direction to the cable fulcrum 39E and then pulley 39A-5 (hidden behind housing panel 23B) redirecting the cable 90° to a horizontal direction and returning to pulley 39A-6 shown mounted on the face of part 23A in FIG. 18. Redirected 90°, the cable 39B passes through the web of part 23A and continues horizontally (out of view*) to pulley 39A-7 mounted to the face of the opposing part 23A where cable 39B is redirected 90° in a horizontal direction to pulley 39A-8 (hidden behind housing panel 23B) which re-directs the cable 90° in downward direction after passing over a cable fulcrum 39E where it terminates at the fixed eye loop 39F mounted to part 66B. (*23A, 39A-7, 39A-8, 39F and 66B not shown.)

A foldable floor panel cable 39D is fixed to a drive gear/lock 40 (not shown, see FIG. 11.) The gear/lock 40 controls the deployment of the foldable floor panel assembly 19. Cable 39D is redirected 90° from a vertical orientation within the void of assembly 13 to a horizontal direction via floor drive pulley 39C-1 which is mounted to face of vertical component 13A of assembly 13. The cable 39D continues in tension and turns 90° by pulley 39C-2 which is mounted to the flange of the longitudinal roof support with pulley housing 23A. Cable 39D is redirected downward at angle by drop pulley 39C-3 and then returns 180° by floor return pulley within housing 39C-4 to pulley 39C-5 (not shown).

Pulley 39C-5 redirects cable 39D to bottom mount pulley 39C-6 (see FIG. 18A) cable 39D continues horizontally (out of view*) to pulley 39C-7 mounted to the bottom of the opposing part 23A where cable 39D is redirected at an angle to a 'D' ring 39G that terminates cable 39D. A floor panel hasp assembly 39H secures the 'D' ring 39G (not shown) and part 39C-4 in place during transport. The assembly 39H comprised of two arms with a 'J' hook on one end (visible in FIG. 18A) secured to a spring hinge on the concealed end which returns the arms to be disposed flush with finish floor 19H of assembly 19 when not in use.

Figure 19:
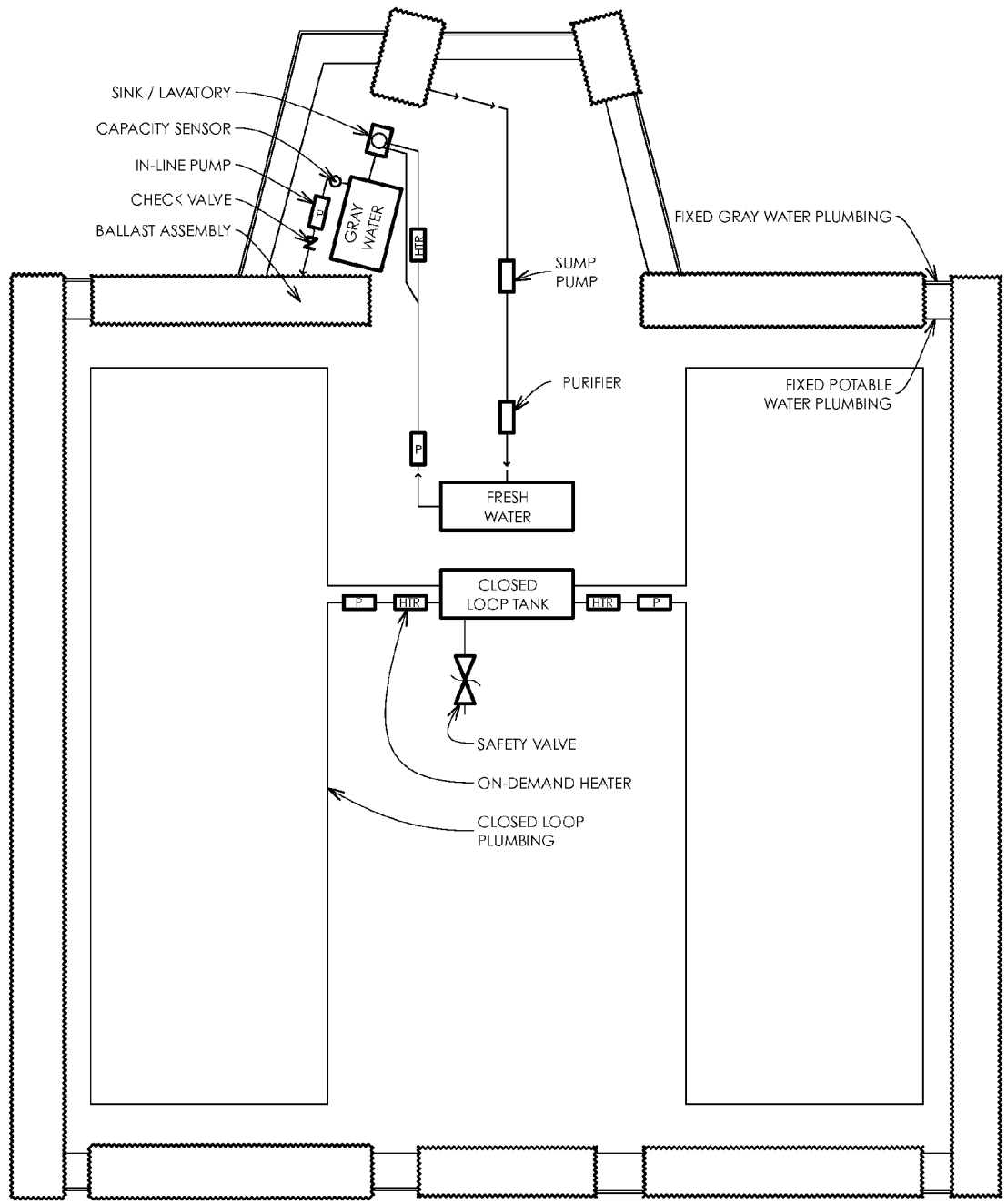
FIG. 19 is a schematic plumbing diagram.

FIG. 19 is a diagram showing the water storage and handling capabilities of the structure 11. Reference numerals are not called out on the FIG. 19 but are listed here for reference back to previous figures. A fixed gray water vessel 44A is located under the sink/lavatory 44. A capacity sensor triggers when the vessel 44A is full and starts a pump to discharge the on-board gray water. The gray water is pumped into the gray water membrane 32F-1 of the ballast assembly 32.

At the same time a sump pump is activated at the opposite end of the ballast assemblies pulling a commensurate quantity of water from the potable water membrane 32F of the ballast assembly 32. The potable water continues through a purification process before entering the on-board fresh water vessel 54. Fresh water is available at the sink/lavatory 44 through a reverses osmosis process, with hot water generated by an on-demand heater. The ballast assemblies 32 can be augmented with harvested rainwater (see FIG. 12) or filled on site at the time of deployment. The interior portion of the diagram shows a hydronic water-heating vessel 68 referred to as a closed loop tank. Using in-line heaters and pumps heated water is circulated through the closed loop plumbing system 19E providing space heating to the occupants of the structure 11.

Figure 20:
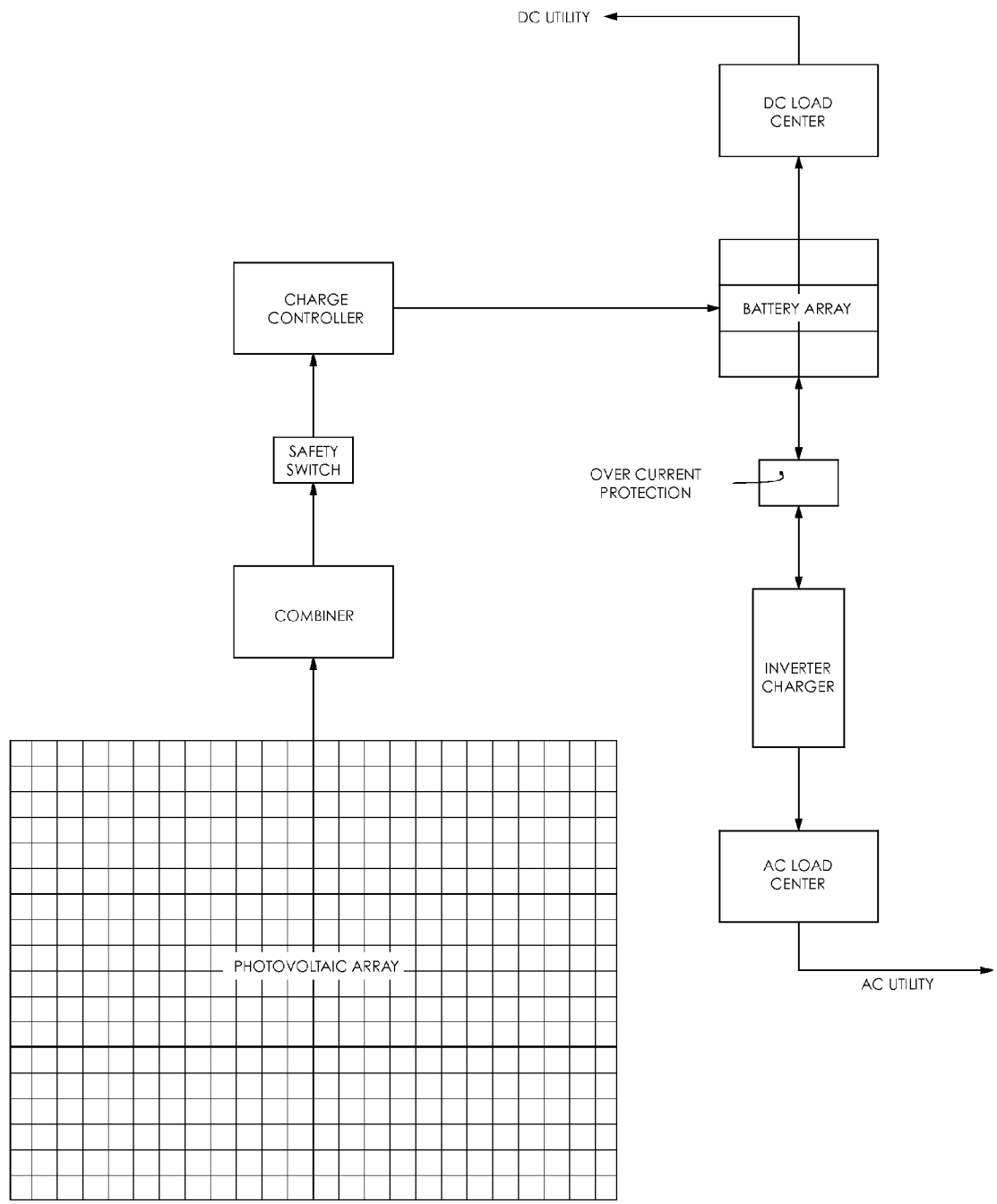
FIG. 20 is a schematic solar energy collector diagram for use of photovoltaic panels

FIG. 20 is a schematic diagram showing the use of a photovoltaic array (PVA) as the energy collector panel 26. The PVA may be one of several panel types that can be used in the energy collector assembly 26. Solar energy striking the PVA is converted to electricity that is stored in batteries for later use in either direct current, DC utilities or alternating current, AC utilities.

Figure 21:
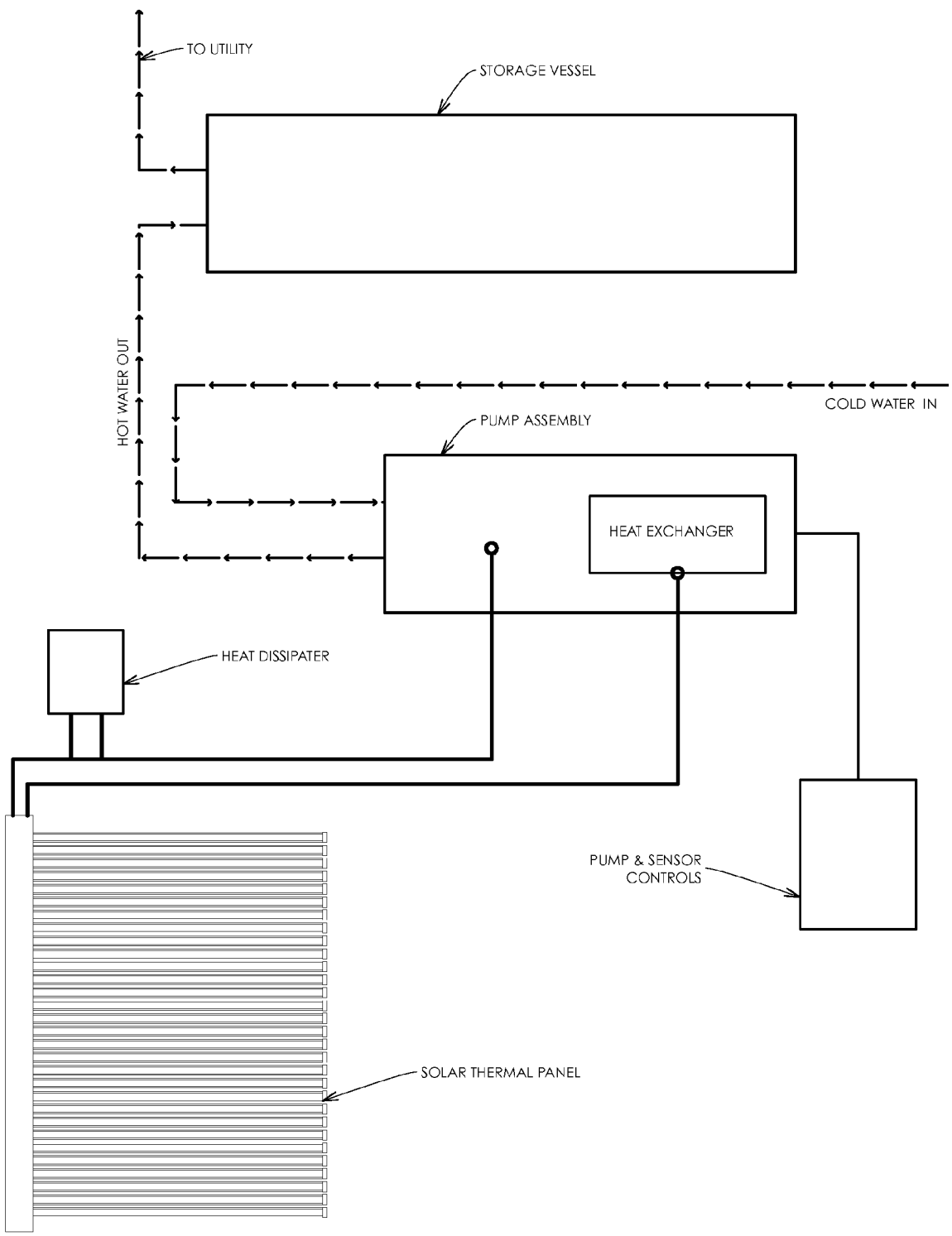
FIG. 21 is a schematic solar energy collector and plumbing diagram for use of solar thermal panels.

FIG. 21 is a schematic diagram showing the use of a solar thermal panel as the energy collector panel 26. Solar energy striking the panel heats the water and through the use of a heat exchanger and pump assembly hot water is directed to a storage vessel for use by utility plumbing fixtures such as for the multiple shower units shown in FIG. 7A. In an alternative embodiment the storage vessel would be the hydronic water heating vessel 68 referred to in FIG. 19, providing the heated water for the closed loop plumbing system 19E.

REFERENCE NUMERALS

11=mobile, expandable, structure
12=body carriage assembly
12A=longitudinal beams
12B=transverse beams
12C=neck
12D=hitch
13=rigid frame assembly
13A=vertical component
13B=horizontal component
14=fixed roof panel assembly
14A=metal 'I' rafters
14B=header angle 14C=rigid insulation
14D=diaphragm substrate
14E=flexible roofing membrane
14F=drip edge trim
15=fixed end wall panel assembly
16=fixed wall panel assembly
15A=top and bottom metal channel
15B=metal 'I' stud framing
15C=rigid insulation
15D=diaphragm substrate
15E=fiberglass siding
16=fixed wall panel assembly
16A=top and bottom metal channel
16B=metal 'I' stud framing
16C=rigid insulation
16D=diaphragm substrate
16E=fiberglass siding
16F=trim with compressible weather-strip
17=fixed floor panel assembly
17A=perimeter metal channel
17B=metal 'I' joists/blocking
17C=rigid insulation
17D=diaphragm
17E=closed loop plumbing system
17F=ledger raceway
17G=utility metal floor
17H=metal clip
18=foldable roof panel assembly
18A=skewed metal channel
18B=metal 'I' rafters/blocking
18C=rigid insulation
18D diaphragm substrate
18E=roof membrane
18F=drip edge flashing
18G=auxiliary metal angle
18H=metal clip
18J=end wall counter flashing
19=foldable floor panel assembly
19A=perimeter metal channel
19B=metal joists/blocking
19C=rigid insulation
19D=diaphragm
19E=closed loop plumbing system
19F=ledger raceway
19G=perimeter insulation
19H=finish floor
19J=thermal break
19K=metal clip
19L=insulation
20=foldable side wall panel assembly
20A=metal track channel/weather-strip
20B=metal 'I' stud framing
20C=rigid insulation
20D=diaphragm substrate
20E=hinged counter flashing
20F=fiberglass siding
20G=outside corner trim
21=foldable end wall panel assembly
21A=metal track channel/weather-strip
21B=metal 'I' stud framing
21C=rigid insulation
21D=diaphragm substrate
21E=counter flashing
21F=fiberglass siding
22=longitudinal roof support
23=lateral roof support
23A=lateral roof support with pulley housing
23B=housing panel
24=edge angle
25=support blocking
26=energy collector assembly
26A=energy collector panel
26B=sliding base
26B-1=guide bar
26C=adjustable lower bed
26D=circular outer wall bearing
26E=radius inner leg flashing
26F=rotatable upper bed
26G=adjustable lower bed bracing
26H=bracing guide
26J=elevation control assembly
26J-1=lever arm
26J-2=control arm
26J-3=through rod
26J-4=pinned arm
26J-5=control housing
26J-6=fixed guide
26K=adjustable upper bed bracing
26L=hinged guide slot
26M=primary torsion spring
26N=arm
26P=radius outer leg flashing
26Q=longitudinal hinge
27=roof overhang assembly
27A=tapered end panel
27B=operable top panel
27C=fixed soffit panel w/drip
27D=continuous drive rod
27E=hinge
27F=void in part 27A
27G=interlocking gutter
27H=mounting panel
27J=cross brace
27K=retractable cable enclosure assembly
27L=slat guide channels
27M=cable/pulley assembly
28=roof hinge
29=floor hinge
30=horizontal wall hinge
31=floor access panel
32=ballast assembly
32A=body mount
32B=body
32C=adjustable leg panel
32D=ballast neck
32E=ballast panel
32F=potable water membrane
32F-1=gray water membrane
32G=access panel
32H=potable water
32J=gray water
32K=fixed gray water plumbing
32L=fixed fresh water plumbing
32M=electric resistance mat
33=modular wall panel assembly
34=primary leveling pad
35=secondary leveling pad
36=downspout
36A=leader
37=roof to floor tension tie assembly
37A=cable/cross rod
37B=cable fulcrum
37C=body
37D=tension paddle 37E=tension paddle hinge
37F=handle/lock
38=wall panel tension tie assembly
39=cabling system assembly
39A-1=roof drive pulley
39A-2=roof pulley A
39A-3=housing pulley
39A-4=return pulley
39A-5=return pulley B
39A-6=roof pulley B
39A-7=roof pulley C
39A-8=return pulley C
39B=foldable roof panel cable
39C-1=floor drive pulley
39C-2=floor pulley A
39C-3=drop pulley
39C-4=floor return pulley with housing
39C-5=floor pulley B
39C-6=bottom mount pulley
39C-7=bottom mount pulley
39C-8=floor pulley C
39D=foldable floor panel cable
39E=cable fulcrum
39F=fixed eye loop
39G=D ring
39H=floor panel hasp assembly
40=drive gear/lock
41=end wall flashing
42=forward enclosure assembly
42A=door panel
42B=hinge
42C=locking mechanism
42D=roof panel
42E=perforated panel
42F=floor panel
43=fuel storage
44=sink/lavatory
44A=gray water vessel
45=incinerating toilet
46=retractable screen assembly
46A=metal slats
46B=longitudinal hinge
46C=center pivot
46D=panel stop
46E=panel head
46F=lock
47=venting skylight
48=running light
49=longitudinal weather-strip
50=remote air conditioning unit
51=mechanical equipment
52=equipment loft assembly
52A=sound dampened floor
52B=sloped side-wall
52C=aperture wall
53=vent stack
54=fresh water vessel
55=energy storage equipment
55A=isolation mounts
56=foldable roof closure panel
57=brake, turn, running light
58=collapsible stair
59=removable handrail
60=end wall tension tie assembly
60A=cable
60B=cable fulcrum
60C=body
60D=tension paddle
60E=tension paddle hinge
60F=handle/lock
61=mechanical equipment vent
62=drainage channel
63=wheel/axle assembly
63A=axle
63B=wheels
63C=leaf spring suspension
64=fender
65=floor extrusion trim
66=guide rail assembly
66A=extruded metal rail
66B=end cap
66C=removable top cap
67=rock guard
68=hydronic heating water vessel
69=series ballast plumbing
69A=fill/overflow
69B=drain
70=water fill-up/drain access panel with lock
71=electrical connection access panel with lock
72=fixed end wall base flashing
73=hinged floor tie assembly
73A=rotatable handle
73B=cam pivot
73C=body
73D=hinge
74=interior partitions
75=extruded metal supports
76=floor drain
77=shower head In operation the sustainable, mobile, expandable structure 11 is towed to or air lifted to an area for deployment. The ground should be reasonably level. The longitudinal and lateral axis of the structure 11 are made level by adjustments of the primary leveling pads 34 as wall as the secondary leveling pad 35 located at the hitch 12D.

Moving to the rear of the structure 11 a worker unlocks the drive gear/lock 40 located at the tapered end panel 27A of the roof overhang assembly 27. Using a simple socket type tool with a lever handle the worker lowers the retractable screen assembly 46 by turning the drive gear/lock 40. Assembly 46 has been used to protect the energy collector assemblies 26 during transport and/or storage. The metal slats 46A retract to be contained within the void of the roof overhang assembly 27 when not in use. Moving to the side of the structure 11 with the energy collector assemblies 26 now visible a worker begins deployment of the individual assemblies 26.

A worker uses a compass to determine south (in the northern hemispheres, or north in the southern hemispheres.) Referring to a location chart the worker looks up the latitude of the deployed locale. The worker by releasing the primary torsion spring 26M that controls the arms 26N sets the pitch of panels 26A to the optimal angle for solar gain once deployed. The elevation control assembly 26J is used to adjust the height of the adjustable lower bed 26C to the middle of three positions (see FIG. 17). This action raises the rotatable upper bed 26F slightly above both the guide rail assemblies 66 and the roof overhang assemblies 27, allowing precise alignment for the optimal sun azimuth angle. The procedure is repeated on the other side of the structure 11.

The assembly 26 is flexible enough for situations requiring the panel's 26A to be rotated 90° from their transport or storage position (see FIG. 15.) In this situation a worker facing the side of the structure 11 raises the adjustable lower bed 26C to the middle position of every other assembly 26 beginning at one end of the structure. Bed 26F is now slightly higher than assemblies 27 and 66. These three assemblies can now be slid temporarily in a downward or vertical direction by means of the sliding base 26B so as to be disposed slightly over assembly 27. Again, the worker by releasing the primary torsion spring 26M that controls the arms 26N sets the pitch of panels 26A to the optimal angle for solar gain once deployed.

The remaining two assemblies can now be adjusted by raising bed 26C to the highest position by using elevation control assembly 26J. This allows the rotatable upper bed 26F the required clearances from the other assemblies 26 and avoids sun shadow from the down slope assemblies when deployed. Pitch angle is set to the optimal angle and the two assemblies are then slid vertically upward by sliding base 26B traveling in the guide rail assemblies 66 until they lock into the their position near the fascia of the fixed roof panel assembly 14 (see FIG. 15). The process is repeated on the other side of the structure 11 keeping in mind the direction of the sun. The first three assemblies 26 are now slid vertically in an upward direction by means of the sliding base 26B to be locked in location as shown in FIG. 15.

When all the energy collector assemblies 26 have been positioned a worker unlocks the drive gear/lock 40 (see FIG. 11) controlling the foldable roof panel assemblies 18. A simple tool is used to turn the drive gear raising assemblies 18 through an approximate 90° arc from vertical. Unlocking the remaining drive gear/lock 40 the tool is used to lower the foldable floor panel assemblies 19 through an approximate 90° arc from vertical.

FIGS. 18 and 18A show the cabling system assembly 39 allowing for deployment of assemblies 18,19 without the use of motors and/or hydraulics. A worker then goes beneath the structure and fixes a series of hinged floor tension assemblies 73 into a locked position, disposing assemblies 17 and 19 to be flush and level with each other. The remaining secondary leveling pads 35 are rotated 90° from their transport position and deployed to add support along the longitudinal sides of the structure 11.

Unlocking the rear door in the fixed end wall panel assembly 15 a worker reaches in to remove and deploy the collapsible stair 58 and removable handrail 59 allowing access to the structure. The foldable roof closure panel 56 is unlocked and deployed. A co-worker helps to lift the foldable sidewall panel assemblies 20 through an approximate 90° arc to be in a vertical position. The foldable end wall panel assemblies are swung horizontally through an approximate 90° arc to be disposed approximately perpendicular to assembly 20. A worker standing in each corner where assemblies 20 and 21 meet applies a small upward force to assembly 18 allowing the final positioning of assemblies 20 and 21 which are both retained on the interior of the structure 11 by the auxiliary metal angle 18G (see FIG. 13).

Assembly 20 is retained on the exterior by mounting panel 27H of assembly 27, while assembly 21 is retained on the exterior by the end wall counter flashing 18J (see FIG. 5). Having no loose parts that can be lost or misplaced proper deployment is maintained through the use of a plurality of tension tie assemblies 60, that help to further fix assemblies 18 to 20 and 21, assemblies 20 to 21 and assemblies 19 to 20 and 21.

Moving to the exterior of the structure 11 a worker uses a simple hooked tool to procure the cable/cross rod 37A from the underside of assemblies 27. The cable is pulled down in a vertical direction and held by the 'J' shaped end of the tension paddle 37D. The paddle 37D is swung on tension paddle hinge 37E through an approximate 90° arc where it is held by a shaped back wall of the body 37C until it is locked by the handle/lock 37F. The cable/cross rod 37A is held in tension by passing over the cable fulcrum 38B and completes the integration of assemblies 18, 19, 20, and 21 when the procedure is repeated around the structure 11.

A worker then unsnaps the collapsible ballast assemblies 32 from their transport mode on the underside of both assemblies 19 and 17. The assemblies 32 drop down to grade where the potable water membranes 32F are filled by the fill/overflow port 69A (see FIG. 12). The ballast assemblies have fixed fresh water plumbing 32L that will allow the perimeter membranes 32F to fill up, however, the process can be hastened by installing the series ballast plumbing 69 shown in FIG. 12. The ballast assemblies 32 provide a substantial vessel for water use and storage during deployment while the perimeter weight factor and wind screening help to counter the effects of wind loading such as up-lift forces on the structure 11. The shape and size of the assemblies 32 can be modified for specific locations or uses adding another level of flexibility to the structure 11. Sustainability is further enhanced by downspout 36 and leader 36A redirecting harvested rainwater back to the membrane 32F.

Another unique feature of the ballast assemblies 32 is that the weight of the water in the ballast assemblies 32 remains essentially the same during periods of deployment. Water use within the structure 11 evacuates a quantity of water from the potable water membrane 32F, while a commensurate quantity of gray water is then released back to membrane 32F-1. FIG. 12 shows the volume of assembly 32 being approximately equal between the potable water 32H and the gray water 32J due to this process.

Flexibility of ballast assemblies is further made possible by various strategies in the handling of the structures gray water. The gray water membrane 32F-1, when full, can be drained by drain 69B while new potable water is introduced to membrane 32F. In another scenario, in jurisdictions that encourage the use of gray water for food or plant growth a drip irrigation system can be tied into drain 69B while an equal quantity of potable water replenishes membrane 32F. Finally with the use of the on board water purification system (see FIG. 19) and a reverse osmosis process at the sink/lavatory water may be recycled in closed loop system allowing for extended deployments.

The invention claimed is:
1. A mobile expandable structure comprising:
a body carriage having rotatable wheels mounted thereunder for enabling said body carriage to roll along a surface;
a plurality of fixed rigid frame assemblies, each of the fixed rigid frame assemblies having a base attached to said body carriage;
a fixed floor panel assembly mounted to said body carriage;
a plurality of fixed end wall panel assemblies each mounted to one of the plurality of fixed rigid frames disposed at each of two ends of said expandable structure;
a plurality of fixed longitudinal roof supports mounted to said fixed rigid frame assemblies;
a fixed roof panel assembly supported by said fixed longitudinal roof supports;
at least one foldable roof panel assembly hinged along a longitudinal edge of the fixed roof panel assembly such that said at least one foldable roof panel assembly forms one of two sides of said mobile expandable structure when in a closed position;
at least one foldable floor panel assembly hinged along a longitudinal edge of the fixed floor panel assembly such that at least one foldable floor panel assembly is dis- posed between said at least one foldable roof panel assembly and the plurality of fixed rigid frames when in a closed position;

at least one foldable side wall panel assembly hinged along a longitudinal edge of the foldable floor panel assembly such that at least one foldable side wall panel assembly is disposed between the at least one foldable roof panel assembly and the plurality of fixed rigid frames when in a closed position; and at least two foldable end wall panels hinged vertically to said rigid frame assemblies disposed at the two ends of said mobile expandable structure, such that the at least two foldable end wall panel assemblies are disposed between the at least one foldable roof panel assembly and the plurality of fixed rigid frames when in a closed position.

2. The mobile expandable structure according to claim 1, wherein;

said fixed floor panel assembly and said fixed roof panel extend in a longitudinal direction for a distance beyond at least one of said fixed end wall panel assemblies; and said mobile expendable structure further comprises at least one fixed wall panel assembly disposed obliquely to at least one of said fixed end wall end panels such that the at least one fixed wall panel assembly encloses an additional area defined by the extended distance of the fixed floor panel assembly and the fixed roof support assembly.

3. The mobile expandable structure according to claim 2, further comprising:

means for deploying at least one solar energy collecting device such that said solar energy collecting device is disposed adjacent to an exterior side of at least one foldable roof panel assembly, and means for adjusting said energy collecting device multi-directionally.

4. The mobile expandable structure according to claim 3, further comprising:

means for deploying at least one retractable screen assembly shielding said energy collecting device assembly when said energy collecting device is in one of a closed or deployed position.

5. The mobile expandable structure according to claim 1, further comprising:

means for deploying a collapsible ballast assembly at one or more perimeter edges of the mobile expandable structure when in a deployed position such that a medium can be stored and used in membranes within the ballast assembly.

6. The mobile expandable structure of claim 1, further comprising a roof diaphragm coupled to the fixed roof support structure.

7. The mobile expandable structure of claim 1, wherein the fixed roof support structure further comprises a plurality of fixed lateral roof supports mounted to said longitudinal roof supports.

8. The mobile expandable structure of claim 1, wherein the fixed roof support structure further comprises a plurality of fixed lateral roof supports mounted to said fixed longitudinal roof supports.

9. The mobile expandable structure of claim 1, wherein the fixed lateral roof supports mounted to said fixed longitudinal roof supports extend in length beyond the longitudinal roof supports in a cantilevered relationship.

* * * * *